(12) United States Patent
Tie et al.

(10) Patent No.: US 11,438,923 B2
(45) Date of Patent: Sep. 6, 2022

(54) METHOD AND APPARATUS FOR TRANSMITTING DATA IN RANDOM ACCESS PROCESS

(71) Applicant: HUAWEI TECHNOLOGIES CO., LTD., Guangdong (CN)

(72) Inventors: Xiaolei Tie, Shanghai (CN); Zhihu Luo, Beijing (CN); Jun Li, Shanghai (CN); Zhe Jin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/992,624

(22) Filed: Aug. 13, 2020

(65) Prior Publication Data
US 2020/0374920 A1 Nov. 26, 2020

Related U.S. Application Data

(63) Continuation of application No. PCT/CN2019/075015, filed on Feb. 14, 2019.

(30) Foreign Application Priority Data

Feb. 14, 2018 (CN) .......................... 201810152311.8
Apr. 4, 2018 (CN) .......................... 201810299318.2

(51) Int. Cl.
*H04W 56/00* (2009.01)
*H04W 74/00* (2009.01)
*H04W 4/12* (2009.01)
*H04W 72/04* (2009.01)
(Continued)

(52) U.S. Cl.
CPC ........... *H04W 74/004* (2013.01); *H04W 4/12* (2013.01); *H04W 72/0446* (2013.01);
(Continued)

(58) Field of Classification Search
CPC . H04W 74/004; H04W 4/12; H04W 72/0446; H04W 72/14; H04W 74/0833; H04W 80/02
(Continued)

(56) References Cited

U.S. PATENT DOCUMENTS

2010/0074130 A1  3/2010 Bertrand et al.
2010/0322172 A1* 12/2010 Hsu ....................... H04L 1/1867
                                                         370/329
(Continued)

FOREIGN PATENT DOCUMENTS

CN    102469615 A    5/2012
CN    107466113 A    12/2017
(Continued)

OTHER PUBLICATIONS

Ericsson:"[99bis#53][MTC/NB-IoT] EDT indication via PRACH", 3GPP TSG-RAN WG2 #100, R2-1713057, Reno, Nevada, USA, Nov. 27-Dec. 1, 2017, total 30 pages.
(Continued)

*Primary Examiner* — Sai Ming Chan
(74) *Attorney, Agent, or Firm* — Womble Bond Dickinson (US) LLP

(57) ABSTRACT

This application provides a method and an apparatus that are for transmitting data in a random access process. The method includes sending a message 1 to a network device. The method further includes receiving a message 2 sent by the network device, where the message 2 includes uplink grant information, where the uplink grant information includes first indication information, and where the first indication information is used to indicate a largest transport block size TBS allowed for a message 3. The method includes determining a target TBS in candidate TBSs based on the allowed largest TBS, where the target TBS is less than or equal to the allowed largest TBS. The method further includes sending the message 3 to the network device, where the message 3 includes uplink data transmitted based on the target TBS.

23 Claims, 7 Drawing Sheets

(51) Int. Cl.
*H04W 72/14* (2009.01)
*H04W 74/08* (2009.01)
*H04W 80/02* (2009.01)

(52) U.S. Cl.
CPC ....... *H04W 72/14* (2013.01); *H04W 74/0833* (2013.01); *H04W 80/02* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0110057 | A1* | 4/2018 | Park | H04B 7/0404 |
| 2018/0279373 | A1* | 9/2018 | Lee | H04W 48/14 |
| 2019/0320467 | A1* | 10/2019 | Freda | H04L 5/0055 |
| 2019/0364605 | A1* | 11/2019 | Loehr | H04W 28/0278 |
| 2020/0367179 | A1* | 11/2020 | Shan | H04W 24/10 |

FOREIGN PATENT DOCUMENTS

| | | | |
|---|---|---|---|
| WO | 2017024912 | A1 | 2/2017 |
| WO | 2018203727 | A1 | 11/2018 |
| WO | 2019145129 | A1 | 8/2019 |

OTHER PUBLICATIONS

Huawei:"RACH procedure in early data transmission", 3GPP TSG RAN WG2 Meeting #100, R2-1713191, Reno, USA, Nov. 27-Dec. 1, 2017, total 3 pages.

MediaTek Inc.,"On NB-IoT EDT indication via PRACH", 36PP TSG RAN WGZ Meeting #100, R2-1713679, Reno, Nevada, USA, Nov. 27-Dec. 1, 2017, total 6 pages.

Ericsson, "Remaining general aspects of early data transmission", 3GPP TSG-RAN WG2 #100 Tdoc R2-1713054, Reno, Nevada, USA, Nov. 27-Dec. 1, 2017, total 7 pages.

3GPP TS 36.213 V15.0.0 (Dec. 2017), 3rd Generation Partnership Project; Technical Specification Group Radio Access Network; Evolved Universal Terrestrial Radio Access (E-UTRA); Physical layer procedures (Release 15), Dec. 2017. total 493 pages.

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), Jan. 9, 2018. total 776 pages.

3GPP TS 36.300 V15.0.0 (Dec. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), Jan. 7, 2018. total 338 pages.

3GPP TS 38.321 V15.0.0 (Dec. 2017), 3rd Generation Partnership Project; Technical Specification Group Radio Access Network; NR; Medium Access Control (MAC) protocol specification (Release 15), Jan. 4, 2018. total 55 pages.

3GPP TS 38.213 V15.0.0 (Dec. 2017), 3rd Generation Partnership Project; Technical Specification Group Radio Access Network; NR; Physical layer procedures for control (Release 15), Jan. 3, 2018. total 56 pages.

\* cited by examiner

| Reserved bits | Timing advance command |
| Timing advance command | Uplink grant |
| Uplink grant ||
| Uplink grant | Reserved bits |
| C-RNTI ||
| C-RNTI ||

FIG. 4

METHOD AND APPARATUS FOR TRANSMITTING DATA IN RANDOM ACCESS PROCESS

CROSS-REFERENCE TO RELATED APPLICATIONS

This application is a continuation of International Application No. PCT/CN2019/075015, filed on Feb. 14, 2019, which claims priority to Chinese Patent Application No. 201810299318.2, filed on Apr. 4, 2018 and Chinese Patent Application No. 201810152311.8, filed on Feb. 14, 2018, all of which are hereby incorporated by reference in their entireties.

TECHNICAL FIELD

This application relates to the communications field, and more specifically, to a method and an apparatus for transmitting data in a random access process.

BACKGROUND

In R13 or R14 of the 3rd generation partnership project (3GPP) protocol, a terminal device needs to first complete random access and establish a radio resource control (RRC) link to a network device (which may be specifically a base station) before transmitting uplink data. However, because the random access and the RRC link establishment require a relatively long interaction time, a transmission delay of the uplink data is relatively large. In addition, because a relatively large amount of signaling is exchanged in a process of the random access and the RRC link establishment, power consumption of the terminal device is also relatively high. Especially, for a cellular-based narrowband internet of things (NB-IoT) terminal device, a delay and power consumption that are caused are more significant.

To reduce a transmission delay of service data and power consumption of a terminal device, 3GPP R15 protocol stipulates that a terminal device may transmit uplink data to a network device in a random access process. Specifically, the terminal device may include the uplink data in a message 3 sent to the network device in the random access process, so as to transmit the uplink data to the network device in the random access process. In the random access process, because the network device does not exactly know a size of the uplink data to be transmitted by the terminal device, the network device can indicate only a largest transport block size (TBS) by using a message 2, so that the terminal device transmits the uplink data to the network device based on the largest TBS. When a size of a transport block (TB) for the uplink data to be transmitted by the terminal device is far less than the TBS indicated by the network device, the terminal device needs to perform large-ratio packet padding at a media access control (MAC) layer. Consequently, uplink resources are wasted, and power consumption of the terminal device increases, resulting in relatively low efficiency for transmitting the uplink data.

SUMMARY

This application provides a method and an apparatus for transmitting data in a random access process, to improve efficiency for transmitting uplink data in the random access process.

According to a first aspect, a method for transmitting data in a random access process is provided. The method includes: sending a message 1 to a network device; receiving a message 2 sent by the network device; determining a target TBS in candidate TBSs based on an allowed TBS; and sending a message 3 to the network device. The message 2 includes uplink grant information. The uplink grant (UL grant) information further includes first indication information. The first indication information is used to indicate a TBS allowed for the message 3. The target TBS is less than or equal to the allowed TBS. The message 3 includes uplink data transmitted based on the target TBS.

Further, the first indication information may specifically indicate a largest TBS allowed for the message 3. In this case, the target TBS is less than or equal to the largest TBS allowed for the message 3. Assuming that the largest TBS allowed for the message 3 is a first TBS, the target TBS can be selected only from options that are in the candidate TBSs and that are less than or equal to the first TBS.

The candidate TBSs are all TBSs available when the message 3 may be sent.

In one embodiment, the message 1 is a preamble sequence sent to the network device.

It should be understood that when the foregoing method is performed by a terminal device or an execution apparatus in the terminal device, the message 1 to the message 3 are messages exchanged with the terminal device in a process in which the terminal device randomly accesses a network.

The message 1 may be specifically a preamble sequence for initiating random access. Further, the message 1 may be used to obtain uplink timing, and a resource location for sending the preamble sequence may be used to implicitly notify the network device of specific information, for example, coverage information of the terminal device, data amount information of the message 3, and transmission mode information (a single subcarrier or a plurality of subcarriers) of the message 3.

The message 2 is used to respond to the message 1. The message 2 includes timing adjustment information, and first indication information of the message 3. The timing adjustment information is used to indicate the terminal device to perform uplink synchronization. The first indication information is used to indicate a resource location for transmitting the message 3.

The message 3 is used to carry the uplink data sent to the network device, and a TBS allowed for the uplink data is indicated by the first indication information in the message 2.

In this application, the target TBS can be freely selected from the candidate TBSs based on the allowed TBS, and the selected target TBS is less than or equal to the allowed TBS. Therefore, in this application, the terminal device can autonomously select an appropriate TBS, without exactly using the allowed TBS indicated by the network device. This improves flexibility for determining a TBS by the terminal device, thereby improving efficiency for transmitting uplink data in a random access process.

In one embodiment, the determining a target TBS in candidate TBSs based on an allowed TBS specifically includes: determining at least one TBS in the candidate TBSs based on the allowed TBS; and determining, in the at least one TBS based on a size of the uplink data, the target TBS that can be used to transmit the uplink data.

In this application, with reference to the allowed TBS and the size of the uplink data, a TBS that matches the size of the uplink data can be selected as the target TBS. This can further reduce a packet padding ratio during transmission of the uplink data, thereby improving efficiency for transmitting the uplink data.

Each of the at least one TBS is less than or equal to the allowed TBS.

In one embodiment, the at least one TBS is a TBS in the candidate TBSs.

The determining at least one TBS in the candidate TBSs may also be understood as determining a first TBS set in the candidate TBSs, where the first TBS set includes the at least one TBS.

The determining at least one TBS in the candidate TBSs based on the allowed TBS may specifically include the following several manners.

Manner 1: Determine, as the at least one TBS, a preset quantity of TBSs in TBSs that are in the candidate TBSs and that are less than or equal to the allowed TBS.

For example, the candidate TBSs include a TBS 1, a TBS 2, a TBS 3, a TBS 4, a TBS 5, and a TBS 6. The TBS 1 to the TBS 6 are 144 bits, 328 bits, 504 bits, 680 bits, 872 bits, and 1000 bits respectively. The allowed largest TBS is 1000 bits, and all TBSs in the candidate TBSs are less than 1000 bits. In this case, four TBSs (the preset quantity is 4) may be selected from the candidate TBSs as the at least one TBS.

In the foregoing example, when four TBSs are selected from the candidate TBSs, four largest TBSs (the TBS 3, the TBS 4, the TBS 5, and the TBS 6) may be selected from the candidate TBSs in descending order as the at least one TBS; or four smallest TBSs (the TBS 1, the TBS 2, the TBS 3, and the TBS 4) may be selected from the candidate TBSs in ascending order as the at least one TBS; or two largest TBSs (the TBS 5 and the TBS 6) and two smallest TBSs (the TBS 1 and the TBS 2) may be selected from the candidate TBSs as the at least one TBS.

Manner 2: Determine, as the at least one TBS, a TBS greater than a preset value in TBSs that are in the candidate TBSs and that are less than or equal to the allowed TBS.

For example, the candidate TBSs include a TBS 1 to a TBS 6. The TBS 1 to the TBS 6 are 144 bits, 328 bits, 504 bits, 680 bits, 872 bits, and 1000 bits respectively. The allowed largest TBS is 1000 bits, and all TBSs in the candidate TBSs are less than 1000 bits. TBSs (the TBS 4, the TBS 5, and the TBS 6) greater than 504 bits (the preset value) are selected from the candidate TBSs as the at least one TBS.

Manner 3: First determine TBSs greater than a preset value in TBSs that are in the candidate TBSs and that are less than or equal to the allowed TBS, and then select a preset quantity of TBSs from the TBSs greater than the preset value as the at least one TBS.

For example, the candidate TBSs include a TBS 1 to a TBS 6. The TBS 1 to the TBS 6 are 144 bits, 328 bits, 504 bits, 680 bits, 872 bits, and 1000 bits respectively. The allowed largest TBS is 1000 bits, and all TBSs in the candidate TBSs are less than 1000 bits. TBSs (the TBS 4, the TBS 5, and the TBS 6) greater than 504 bits (the preset value) are selected from the candidate TBSs as TBSs greater than the preset value, and then two TBSs (the TBS 5 and the TBS 6) are selected from the TBSs greater than the preset value as the at least one TBS.

In addition, the determining, in the at least one TBS, the target TBS that can be used to transmit the uplink data may be specifically: determining, in the at least one TBS as the target TBS, a TBS that is greater than or equal to a size of a TB corresponding to the uplink data and whose difference from the size of the TB corresponding to the uplink data falls within a preset range.

For example, the at least one TBS includes a TBS 1, a TBS 2, and a TBS 3 in total. The TBS 1 is 504 bits, the TBS 2 is 680 bits, the TBS 3 is 872 bits, and the size of the TB corresponding to the uplink data is 650 bits. In the TBS 1, the TBS 2, and the TBS 3, both the TBS 2 and the TBS 3 are greater than the size of the TB corresponding to the uplink data. A difference between the TBS 2 and the size of the TB corresponding to the uplink data is 30 bits. A difference between the TBS 3 and the size of the TB corresponding to the uplink data is 222 bits. Assuming that a preset range of a difference between the size of the TB corresponding to the uplink data and a TBS is less than or equal to 250 bits, the difference between the size of the TB corresponding to the uplink data and each of the TBS 2 and the TBS 3 falls within the preset range of the difference. In this case, any TBS may be selected from the TBS 2 and the TBS 3 as the target TBS.

Alternatively, a TBS that is greater than or equal to a size of a TB corresponding to the uplink data and that has a smallest difference from the size of the TB corresponding to the uplink data may be determined in the at least one TBS as the target TBS.

For example, the at least one TBS includes a TBS 1, a TBS 2, and a TBS 3 in total. The TBS 1 is 504 bits, the TBS 2 is 680 bits, the TBS 3 is 872 bits, and the size of the TB corresponding to the uplink data is 650 bits. In the TBS 1, the TBS 2, and the TBS 3, both the TBS 2 and the TBS 3 are greater than the size of the TB corresponding to the uplink data. A difference between the TBS 2 and the size of the TB corresponding to the uplink data is 30 bits. A difference between the TBS 3 and the size of the TB corresponding to the uplink data is 222 bits. Because the difference between the TBS 2 and the size of the TB corresponding to the uplink data is smaller, the TBS 2 is selected as the target TBS.

In one embodiment, before the determining a target TBS in candidate TBSs based on an allowed TBS, the method further includes: determining whether a preset condition is met; and when the preset condition is met, determining the target TBS in the candidate TBSs based on the allowed TBS.

In this application, the target TBS can be determined, based on the allowed TBS, in the candidate TBSs only in a specific case (the preset condition is met), so that the terminal device can flexibly determine, based on an actual case, a selection manner for selecting the target TBS.

Further, when the preset condition is not met, the message 3 is sent (by the terminal device) to the network device based on the allowed TBS and the resource location that are indicated by the first indication information in the message 2.

In one embodiment, the preset condition is that a coverage level of the terminal device meets a preset condition.

In one embodiment, that a coverage level of the terminal device meets a preset condition includes at least one of the following cases: A coverage level corresponding to the message 1 sent by the terminal device to the network device is lower than a coverage level threshold; a coverage level corresponding to the message 1 sent by the terminal device to the network device is higher than a coverage level threshold; or a coverage level corresponding to the message 1 sent by the terminal device to the network device is equal to a coverage level threshold.

The coverage level threshold may be an agreed value, or may be notified by the network device to the terminal device by using indication information. The indication information is used to indicate the coverage level threshold.

In one embodiment, that a coverage level of the terminal device meets a preset condition includes at least one of the following cases: A coverage level corresponding to the message 1 sent by the terminal device to the network device belongs to a coverage level set indicated by a base station; or a coverage level corresponding to the message 1 sent by the terminal device to the network device does not belong to a coverage level set indicated by a base station.

The coverage level set may be an agreed set, or is notified by the network device to the terminal device by using indication information. The indication information is used to indicate the coverage level set.

In one embodiment, the terminal device determines, based on a measurement result for a current measurement quantity and a measurement quantity threshold configured by the network device, the coverage level corresponding to the message 1 sent by the terminal device to the network device.

In one embodiment, that the preset condition is met includes at least one of the following cases: The allowed TBS is greater than a TBS threshold; the allowed TBS is less than a TBS threshold; or the allowed TBS is equal to a TBS threshold.

The TBS threshold may be an agreed value, or may be notified by the network device to the terminal device by using indication information. The indication information is used to indicate the TBS threshold.

In one embodiment, the message 1 is carried on a first resource, and the message 1 is carried on the first resource to indicate to send the uplink data through the message 3 to the network device.

In this application, whether to transmit the uplink data in a random access process can be flexibly indicated depending on whether the message 1 is carried on a specific resource, so that the network device receives the uplink data conveniently.

Specifically, when the message 1 is carried on the specific resource, the network device receives the uplink data in the random access process; or when the message 1 is carried on a resource other than the specific resource, the network device can receive the uplink data only after random access is completed (which may be specifically after an RRC link is established).

It should be understood that whether the message 1 is carried on a specific resource may alternatively not be limited in this application. To be specific, regardless of a resource on which the message 1 is sent, the uplink data may be transmitted to the network device in the random access process.

Specifically, when the foregoing method is performed by the terminal device, if the terminal device sends the message 1 on the first resource, the terminal device sends the uplink data to the network device in the random access process; or if the terminal device sends the message 1 on a resource other than the first resource, the terminal device sends the uplink data to the network device only after completing random access and establishing an RRC link to the network device.

In one embodiment, the method further includes: receiving second indication information sent by the network device, where the second indication information is used to indicate to re-send the message 3 and indicate an updated TBS to be used for re-sending the message 3; and when the updated TBS is consistent with the target TBS, re-sending the message 3 to the network device. The re-sent message 3 includes the uplink data transmitted based on the target TBS.

In this application, the second indication information is used to indicate to re-send the message 3, so that reliability for transmitting the uplink data can be improved.

It should be understood that when the network device does not correctly decode the message 3, the network device may indicate, by sending the second indication information, to re-send the message 3, so that the network device can parse out the uplink data in the message 3.

In addition, in a process of decoding the message 3, the network device may use the parsed-out target TBS as the updated TBS to be used for re-sending the message 3. If the updated TBS is the same as the target TBS, the network device has correctly parsed out the target TBS in the process of decoding the message 3. Then the terminal device may directly re-send the message 3 to the network device. However, if the updated TBS is different from the target TBS, it is very likely that the network device has not correctly parsed out the target TBS in the process of decoding the message 3. Therefore, even if the terminal device re-sends the message 3 to the network device, the network device cannot parse out the uplink data in the message 3 based on the target TBS. In this case, the terminal device may perform random access again to send the uplink data.

In one embodiment, the method further includes: receiving second indication information sent by the network device, where the second indication information is used to indicate to re-send the message 3 and indicate an updated TBS to be used for re-sending the message 3; and when the updated TBS is inconsistent with the target TBS, re-sending the message 1 to the network device to perform random access again, where the message 1 is carried on a second resource to indicate to send the uplink data to the network device after the random access is completed again, and the second resource is different from the first resource.

In this application, when the uplink data cannot be sent in the random access process, the message 1 may be re-sent to perform random access again, and the uplink data is transmitted after the random access is completed, so that reliability for transmitting the uplink data can be improved.

In one embodiment, the method further includes: receiving second indication information sent by the network device, where the second indication information is used to indicate to re-send the message 3 and indicate an updated TBS to be used for re-sending the message 3; and when the updated TBS is inconsistent with the target TBS, re-sending the message 1 to the network device to perform random access again, where the message 1 is carried on the first resource to indicate to send the uplink data to the network device when a random access process is performed again.

In this application, when the uplink data cannot be sent in the random access process, the message 1 may be re-sent to perform random access again, and the uplink data is retransmitted in a random access process, so that reliability for transmitting the uplink data can be improved.

In this application, when the uplink data cannot be sent in the random access process, random access may be performed again, and the uplink data may be sent in a random access process; or random access may be performed again, and the uplink data is sent after the random access is completed.

In one embodiment, a manner of sending the message 3 is used to indicate the target TBS.

In this application, the target TBS is indicated by the manner of sending the message 3, so that the network device can decode the message 3 based on the target TBS, thereby simplifying a decoding procedure.

In one embodiment, a DMRS sequence used to send the message 3 may be used to indicate the target TBS.

In this application, the network device may determine the target TBS by determining the DMRS sequence used to send the message 3, so as to perform accurate decoding based on the target TBS subsequently.

Specifically, there is a one-to-one or many-to-one correspondence between a DMRS sequence and a TBS, and one TBS may correspond to at least one DMRS sequence. When a DMRS sequence is used to send the message 3, a TBS corresponding to the DMRS sequence is the target TBS.

For example, TBSs corresponding to a DMRS sequence 1, a DMRS sequence 2, and a DMRS sequence 3 are a TBS 1, a TBS 2, and a TBS 3 respectively. In this case, when the DMRS sequence 2 is used to send the message 3, the TBS 2 is the target TBS.

In one embodiment, a time-domain offset, relative to a resource allocated by the network device, of a time-domain start location of a physical uplink shared channel for sending the message 3 is used to indicate the target TBS.

The time-domain start location may be specifically a location of a start symbol.

In this application, the network device may determine the target TBS by using the time-domain offset, relative to the resource allocated by the network device, of the time-domain start location of the physical uplink shared channel for sending the message 3, so as to perform accurate decoding based on the target TBS.

Specifically, there is a one-to-one or many-to-one correspondence between a time-domain offset, relative to the resource allocated by the network device, of the time-domain start location of the physical uplink shared channel for sending the message 3 and a TBS, and one TBS may correspond to at least one offset value. When sending of the message 3 corresponds to an offset value, a TBS corresponding to the offset value is the target TBS.

For example, time-domain offset values, relative to the resource allocated by the network device, of the time-domain start location of the physical uplink shared channel for sending the message 3 include an offset 1, an offset 2, an offset 3, and an offset 4, and TBSs corresponding to these offset values are a TBS 1, a TBS 2, a TBS 3, and a TBS 4 respectively. In this case, when a time-domain offset value, relative to the resource allocated by the network device, of the time-domain start location of the physical uplink shared channel for sending the message 3 is the offset 2, the TBS 2 is the target TBS.

According to a second aspect, a method for transmitting data in a random access process is provided. The method includes: receiving a message 1 sent by a terminal device; sending a message 2 to the terminal device in response to the message 1, where the message 2 includes uplink grant information, the uplink grant information includes first indication information, and the first indication information is used to indicate a transport block size TBS allowed for a message 3; receiving the message 3 sent by the terminal device; determining, by a network device, a target TBS based on a manner of sending the message 3; and decoding the message 3.

The method in the second aspect of this application corresponds to the method in the first aspect. The method in the first aspect may be performed by a terminal device, and the method in the second aspect may be performed by a network device.

In this application, the target TBS can be determined based on the manner of sending the message 3, so that the message 3 can be quickly decoded based on the target TBS, thereby improving efficiency for decoding uplink data.

In one embodiment, the manner of sending the message 3 is used to indicate the target TBS.

In one embodiment, a DMRS sequence used to send the message 3 may be used to indicate the target TBS.

In this application, the network device may determine the target TBS by determining the DMRS sequence used to send the message 3, so as to perform accurate decoding based on the target TBS subsequently.

Specifically, there is a one-to-one or many-to-one correspondence between a DMRS sequence and a TBS, and one TBS may correspond to at least one DMRS sequence. When a DMRS sequence is used to send the message 3, a TBS corresponding to the DMRS sequence is the target TBS.

For example, TBSs corresponding to a DMRS sequence 1, a DMRS sequence 2, and a DMRS sequence 3 are a TBS 1, a TBS 2, and a TBS 3 respectively. In this case, when the DMRS sequence 2 is used to send the message 3, the TBS 2 is the target TBS.

In one embodiment, a time-domain start location of a physical uplink shared channel for sending the message 3 has a time-domain offset relative to a resource allocated by the network device.

Specifically, the time-domain start location may be a location of a start symbol.

In this application, the network device may determine the target TBS by using the time-domain offset, relative to the resource allocated by the network device, of the time-domain start location of the physical uplink shared channel for sending the message 3, so as to perform accurate decoding based on the target TBS.

Specifically, there is a one-to-one or many-to-one correspondence between a time-domain offset, relative to the resource allocated by the network device, of the time-domain start location of the physical uplink shared channel for sending the message 3 and a TBS, and one TBS may correspond to at least one offset value. When sending of the message 3 corresponds to an offset value, a TBS corresponding to the offset value is the target TBS.

For example, time-domain offset values, relative to the resource allocated by the network device, of the time-domain start location of the physical uplink shared channel for sending the message 3 include an offset 1, an offset 2, an offset 3, and an offset 4, and TBSs corresponding to these offset values are a TBS 1, a TBS 2, a TBS 3, and a TBS 4 respectively. In this case, when a time-domain offset value, relative to the resource allocated by the network device, of the time-domain start location of the physical uplink shared channel for sending the message 3 is the offset 2, the TBS 2 is the target TBS.

According to a third aspect, an apparatus for transmitting data in a random access process is provided. The apparatus includes modules configured to perform the method in the first aspect or the implementations of the first aspect.

According to a fourth aspect, an apparatus for transmitting data in a random access process is provided. The apparatus includes modules configured to perform the method in the second aspect or the implementations of the second aspect.

According to a fifth aspect, an apparatus for transmitting data in a random access process is provided. The apparatus includes: a memory, configured to store program instructions, a processor coupled to the memory and a transceiver, where the processor is configured to execute the program instructions stored in the memory, and when the program instructions are executed, cause the processor of the apparatus to perform the method in the first aspect or the implementations of the first aspect. When a signal needs to be sent or received, the processor controls the transceiver to send or receive the signal.

According to a sixth aspect, an apparatus for transmitting data in a random access process is provided. The apparatus includes: a memory, configured to store program instructions, a processor coupled to the memory and a transceiver, where the processor is configured to execute the program instructions stored in the memory, and when the program instructions are executed, cause the processor of the apparatus to perform the method in the second aspect or the implementations of the second aspect. When a signal needs to be sent or received, the processor controls the transceiver to send or receive the signal.

In one embodiment, the apparatuses in the third aspect and the fifth aspect may be terminal devices.

In one embodiment, the apparatuses in the fourth aspect and the sixth aspect may be network devices.

According to a seventh aspect, a non-transitory computer readable storage medium is provided. The non-transitory computer readable storage medium stores program code to be executed by a device. The program code includes instructions to perform the method in the first aspect or the implementations of the first aspect.

According to an eighth aspect, a non-transitory computer readable storage medium is provided. The non-transitory computer readable storage medium stores program code to be executed by a device. The program code includes instructions to perform the method in the second aspect or the implementations of the second aspect.

According to a ninth aspect, computer program code is provided. The program code includes instructions to perform the method in the first aspect or the implementations of the first aspect.

According to a tenth aspect, computer program code is provided. The program code includes instructions to perform the method in the second aspect or the implementations of the second aspect.

BRIEF DESCRIPTION OF DRAWINGS

FIG. 4 is a schematic structural diagram of a random access response;

DESCRIPTION OF EMBODIMENTS

The following describes technical solutions of this application with reference to the accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device; or the network device may be a radio controller in a cloud radio access network (CRAN) scenario; or the network device may be a relay station, an access point, a vehicle-mounted device, a wearable device, a network device in a future 5G network, a network device in a future evolved PLMN, or the like. This is not limited in the embodiments of this application.

Figure 1:
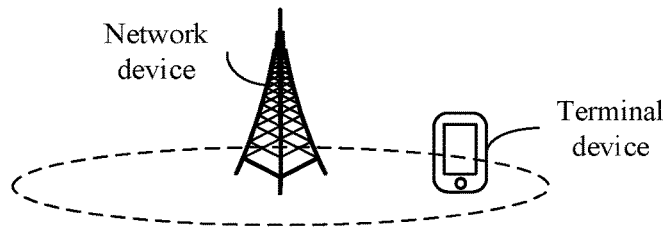
FIG. 1 is a schematic architectural diagram of a communications system to which an embodiment of this application is applied.

FIG. 1 is a schematic architectural diagram of a communications system to which an embodiment of this application is applied.

The communications system shown in FIG. 1 includes a network device and a terminal device. In the communications system shown in FIG. 1, the terminal device may access a mobile communications network in a random access manner, and the terminal device may further send uplink data to the network device in a random access process. It should be understood that FIG. 1 shows only one network device and one terminal device. Actually, the communications system to which the embodiments of this application are applied may be a system including a plurality of network devices and a plurality of terminal devices. In addition, the network device in FIG. 1 may specifically include an access network device, a core network device, and the like.

Specifically, the network device shown in FIG. 1 may be an access device used by the terminal device to access the communications system in a wireless manner, and may be a NodeB, an evolved NodeB (eNodeB), a base station in a 5G communications system, a base station in a future communications system, an access node in a wireless fidelity (Wi-Fi) system, or the like. A specific technology and a specific device form that are used for the network device are not limited in the embodiments of this application.

It should be understood that FIG. 1 is merely a schematic diagram of a communications system to which the embodiments of this application may be applied. The embodiments of this application may be further applied to another communications system in which a network device can communicate with a terminal device. A specific form of the communications system to which the embodiments of this application may be applied is not limited in the embodiments of this application.

Further, the embodiments of this application may be specifically applied to a communications system in the narrowband internet of things (NB-IoT), an enhanced machine type communication (eMTC) system, and the like.

Figure 2:
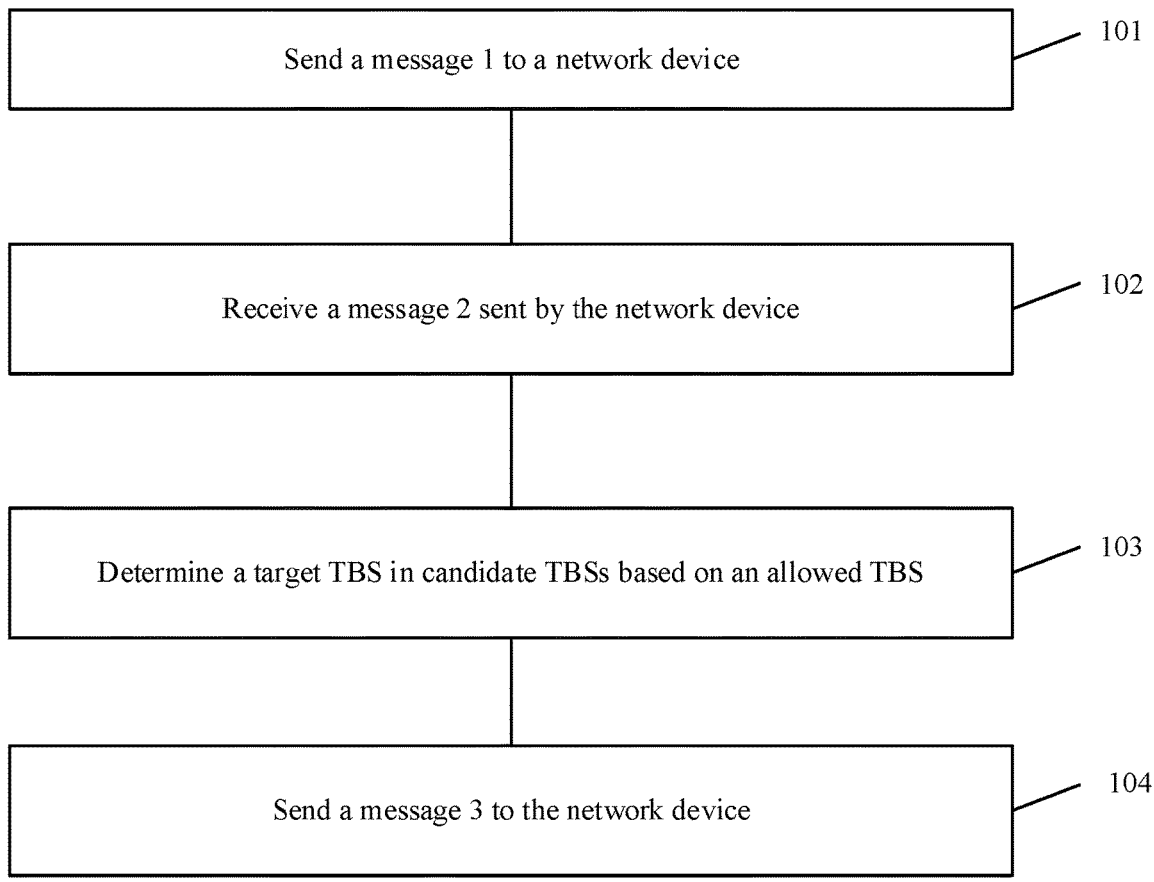
FIG. 2 is a schematic flowchart of a method for transmitting data in a random access process according to an embodiment of this application.

FIG. 2 is a schematic flowchart of a method for transmitting data in a random access process according to an embodiment of this application. The method shown in FIG. 2 may be performed by a terminal device. The method shown in FIG. 2 specifically includes operation 101 to operation 104. The following separately describes operation 101 to operation 104 in detail.

101. Send a message 1 to a network device.

The message 1 may also be referred to as an Msg1 (message 1), and the message 1 may be specifically a preamble sequence.

When sending the preamble sequence, the terminal device may randomly select a resource to send the preamble sequence. If a plurality of terminal devices send a same preamble sequence on a same resource, a collision occurs. If a plurality of terminals send different preamble sequences on a same resource and the sequences are orthogonal, no collision occurs.

102. Receive a message 2 sent by the network device.

The message 2 includes uplink grant (UL grant) information. The uplink grant information further includes first indication information. The first indication information is used to indicate a TBS allowed for a message 3.

In one embodiment, the first indication information may further specifically indicate a largest TBS allowed for the message 3. For example, the first indication information may indicate that the largest TBS allowed for the message 3 is 1000 bits. In this case, the TBS allowed for the message 3 cannot exceed 1000 bits.

After detecting the preamble sequence on a time-frequency resource, the network device includes the preamble sequence in the message 2 (Msg2), indicating that the network device detects the preamble sequence. In addition, the network device further includes a random access response (RAR) in the message 2. A quantity of preamble sequences detected by the network device on the time-frequency resource is equal to a quantity of random access responses (RARs) included by the network device in the message 2.

Figure 3:
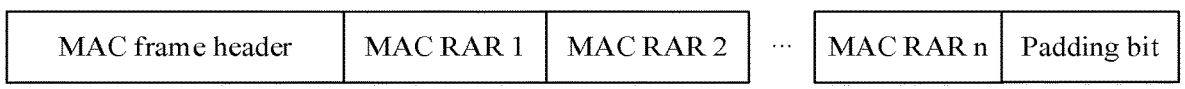
FIG. 3 is a schematic structural diagram of a message 2.

For example, the following describes a structure of the message 2 with reference to FIG. 3. As shown in FIG. 3, the message 2 includes a MAC frame header and a random access response. In addition, the message 2 may further include a padding bit. The MAC frame header includes a plurality of MAC subheaders, and a MAC subheader includes a backoff identifier and a random access preamble identifier.

When the network device detects n (n is an integer greater than or equal to 1) preamble sequences, the MAC frame header in the message 2 includes n random access preamble identifiers (RAPID), and the random access response in the message 2 includes n random access responses (a MAC RAR 1, a MAC RAR 2, ..., a MAC RAR n).

For example, a specific structure of the random access response is shown in FIG. 4. The random access response specifically includes a timing advanced command, an uplink grant (UL Grant), a cell radio network temporary identifier (C-RNTI), and reserved bits.

In one embodiment, the message 2 includes uplink grant (UL grant) information, the uplink grant information further includes first indication information, and the first indication information and a TBS threshold jointly indicate the TBS allowed for the message 3. The allowed TBS may be greater than or equal to or less than the TBS threshold. For example, the TBS threshold is equal to 424 bits, and the allowed TBS determined based on the first indication information and the TBS threshold may be 504 bits, 424 bits, or 408 bits.

In one embodiment, the first indication information and the TBS threshold jointly indicate the largest TBS allowed for the message 3. The allowed largest TBS may be greater than or equal to or less than the TBS threshold. For example, the TBS threshold is equal to 776 bits, and the allowed largest TBS determined based on the first indication information and the TBS threshold may be 808 bits, 776 bits, or 712 bits.

The TBS threshold may be a preset agreed value, or may be notified by the network device to the terminal device by using indication information. The indication information is used to indicate the TBS threshold.

In one embodiment, the message 2 includes uplink grant (UL grant) information, the uplink grant information may further include third indication information, and the third indication information indicates a quantity of resource units for the message 3, or the third indication information and a TBS threshold jointly indicate a quantity of resource units for the message 3. For example, when the TBS threshold is 776 bits and the third indication information is '100', it indicates that the quantity of resource units is 5.

The TBS allowed for the Msg3 is determined based on the quantity of resource units. The allowed TBS may be greater than or equal to or less than the TBS threshold.

For example, in Table 1, whether a TBS set in a column in which the quantity of resource units is located includes the TBS threshold may be determined based on the column. If the TBS threshold is included, the allowed TBS is equal to the TBS threshold. For example, the quantity of resource units is 5, an index $I_{RU}$ of a corresponding resource unit is 4, and it is determined that the TBS set in the column in which the quantity of resource units is located is {120, 176, 208, 256, 328, 424, 504, 584, 680, 776, 872, 1000}. The TBS set includes the TBS threshold: 776 bits. Therefore, it is determined that the allowed TBS is 776 bits. If the TBS set does not include the TBS threshold, a TBS that is in the TBS set and that is closest to the TBS threshold and greater than or less than the TBS threshold is determined as the allowed TBS. For example, the TBS threshold is 872 bits, the quantity of resource units is 6, and the determined TBS set is {152, 208, 256, 328, 408, 504, 600, 712, 808, 936, 1000}. If the TBS set does not include the TBS threshold (872 bits), a TBS that is in the TBS set and that is closest to the TBS threshold (872 bits) and greater than the TBS threshold is determined as the allowed TBS. In other words, 936 is determined as the allowed TBS; or a TBS that is in the TBS set and that is closest to the TBS threshold (872 bits) and less than the TBS threshold is determined as the allowed TBS. In other words, 808 is determined as the allowed TBS.

In one embodiment, the allowed largest TBS may be determined based on the quantity of resource units. Likewise, in Table 1, whether a TBS set in a column in which the quantity of resource units is located includes the TBS threshold may be determined based on the column. If the TBS threshold is included, the allowed largest TBS is the TBS threshold. If the TBS set does not include the TBS threshold, a TBS that is in the TBS set and that is closest to the TBS threshold and greater than or less than the TBS threshold is determined as the allowed largest TBS.

For example, the TBS threshold is 872 bits, the quantity of resource units is 6, and the determined TBS set is {152, 208, 256, 328, 408, 504, 600, 712, 808, 936, 1000}. If the TBS set does not include the TBS threshold (872 bits), a TBS that is in the TBS set and that is closest to the TBS threshold (872 bits) and greater than the TBS threshold is determined as the allowed largest TBS, in other words, 936 is determined as the allowed largest TBS; or a TBS that is in the TBS set and that is closest to the TBS threshold (872 bits) and less than the TBS threshold is determined as the allowed largest TBS, in other words, 808 is determined as the allowed TBS.

The TBS threshold may be a preset agreed value, or may be notified by the network device to the terminal device by using indication information. The indication information is used to indicate the TBS threshold.

Specifically, when the TBS threshold is 1000 and the third indication information in the UL grant includes '011', '100', '101', '110', and '111', allowed largest TBSs determined for different quantities of resource units are shown in Table 2. For example, when the UL grant is 011 and the TBS threshold is 1000, the allowed largest TBS is 1000, and the quantity of resource units (resource unit, RU) is 4.

TABLE 2

| UL grant | Allowed largest TBS, quantity of resource units |
|---|---|
| '011' | 1000 bits, 4 RUs |
| '100' | 1000 bits, 5 RUs |
| '101' | 1000 bits, 6 RUs |
| '110' | 1000 bits, 8 RUs |
| '111' | 1000 bits, 10 RUs |

TBS threshold = 1000

Specifically, when the TBS threshold is 872 and the third indication information in the UL grant includes '011', '100', '101', '110', and '111', allowed largest TBSs determined for different quantities of resource units are shown in Table 3.

TABLE 3

| UL grant | Allowed largest TBS, quantity of resource units |
|---|---|
| '011' | 1000 bits, 4 RUs |
| '100' | 872 bits, 5 RUs |
| '101' | 936 bits, 6 RUs |
| '110' | 1000 bits, 8 RUs |
| '111' | 872 bits, 10 RUs |

TBS threshold = 872

Specifically, when the TBS threshold is 776 and the third indication information in the UL grant includes '011', '100', '101', '110', and '111', allowed largest TBSs determined for different quantities of resource units are shown in Table 4.

TABLE 4

| UL grant | Allowed largest TBS, quantity of resource units |
|---|---|
| '011' | 776 bits, 4 RUs |
| '100' | 776 bits, 5 RUs |
| '101' | 808 bits, 6 RUs |
| '110' | 808 bits, 8 RUs |
| '111' | 872 bits, 10 RUs |

TBS threshold = 776

Specifically, when the TBS threshold is 680 and the third indication information in the UL grant includes '011', '100', '101', '110', and '111', allowed largest TBSs determined for different quantities of resource units are shown in Table 5.

TABLE 5

| UL grant | Allowed largest TBS, quantity of resource units |
|---|---|
| '011' | 680 bits, 3 RUs |
| '100' | 680 bits, 4 RUs |
| '101' | 680 bits, 5 RUs |
| '110' | 680 bits, 6 RUs |
| '111' | 680 bits, 10 RUs |

TBS threshold = 680

Specifically, when the TBS threshold is 504 and the third indication information in the UL grant includes '011', '100', '101', '110', and '111', allowed largest TBSs determined for different quantities of resource units are shown in Table 6.

TABLE 6

| UL grant | Allowed largest TBS, quantity of resource units |
|---|---|
| '011' | 504 bits, 3 RUs |
| '100' | 536 bits, 4 RUs |
| '101' | 504 bits, 5 RUs |
| '110' | 504 bits, 6 RUs |
| '111' | 552 bits, 8 RUs |

TBS threshold = 504

Specifically, when the TBS threshold is 424 and the third indication information in the UL grant includes '011', '100', '101', '110', and '111', allowed largest TBSs determined for different quantities of resource units are shown in Table 7.

TABLE 7

| UL grant | Allowed largest TBS, quantity of resource units |
|---|---|
| '011' | 440 bits, 2 RUs |
| '100' | 456 bits, 3 RUs |
| '101' | 472 bits, 4 RUs |
| '110' | 424 bits, 5 RUs |
| '111' | 504 bits, 6 RUs |

TBS threshold = 424

Specifically, when the TBS threshold is 328 and the third indication information in the UL grant includes '011', '100', '101', '110', and '111', allowed largest TBSs determined for different quantities of resource units are shown in Table 8.

TABLE 8

| UL grant | Allowed largest TBS, quantity of resource units |
|---|---|
| '011' | 328 bits, 2 RUs |
| '100' | 328 bits, 3 RUs |
| '101' | 328 bits, 4 RUs |
| '110' | 328 bits, 5 RUs |
| '111' | 328 bits, 6 RUs |

TBS threshold = 328

Specifically, when the TBS threshold is 256 and the third indication information in the UL grant includes '011', '100', '101', '110', and '111', allowed largest TBSs determined for different quantities of resource units are shown in Table 9.

TABLE 9

| UL grant | Allowed largest TBS, quantity of resource units |
|---|---|
| '011' | 256 bits, 2 RUs |
| '100' | 256 bits, 3 RUs |
| '101' | 256 bits, 4 RUs |
| '110' | 256 bits, 5 RUs |
| '111' | 256 bits, 6 RUs |

TBS threshold = 256

It should be understood that values in Table 2 to Table 9 are merely examples. In addition, a correspondence between a UL grant, and an allowed largest TBS and a quantity of resource units in the tables is not limited in the present invention. For example, it should be understood that 011 may alternatively correspond to 1000 bits, 6 RUs in Table 2.

It should be understood that the allowed largest TBS in Table 2 to Table 9 may be alternatively replaced with the allowed TBS. In addition, the allowed largest TBS may be alternatively less than the TBS threshold. Table 2 to Table 9 list only cases in which the largest TBS is greater than or equal to the TBS threshold.

In one embodiment, the message 2 includes uplink grant (UL grant) information, the uplink grant information may further include fourth indication information, and the fourth indication information indicates a TBS index of the message 3, or the fourth indication information and a TBS threshold jointly indicate a TBS index of the message 3. For example, when the TBS threshold is 776 bits and the third indication information is '100', it indicates that the TBS index $I_{TBS}$ is 5.

The TBS allowed for the Msg3 is determined based on the TBS index $I_{TBS}$. The allowed TBS may be greater than or equal to or less than the TBS threshold.

For example, in Table 1, whether a TBS set in a row in which the TBS index $I_{TBS}$ is located includes the TBS threshold may be determined based on the row. If the TBS threshold is included, the allowed TBS is equal to the TBS threshold. For example, if the TBS index $I_{TBS}$ is 9, it is determined that the TBS set in the row in which the TBS index $I_{TBS}$ is located is {136, 296, 456, 616, 776, 936}. The TBS set includes the TBS threshold: 776 bits. Therefore, it is determined that the allowed TBS is 776 bits. If the TBS set does not include the TBS threshold, a TBS that is in the TBS set and that is closest to the TBS threshold and greater than or less than the TBS threshold is determined as the allowed TBS. For example, if the TBS threshold is 872 bits, a TBS that is in the TBS set and that is closest to the TBS threshold (872 bits) and greater than the TBS threshold is determined as the allowed TBS, that is, 936 is determined as the allowed TBS; or a TBS that is in the TBS set and that is closest to the TBS threshold (872 bits) and less than the TBS threshold is determined as the allowed TBS, that is, 776 is determined as the allowed TBS.

In one embodiment, the largest TBS allowed for the Msg3 may be determined based on the TBS index $I_{TBS}$. Likewise, in Table 1, whether a TBS set in a row in which the TBS index $I_{TBS}$ is located includes the TBS threshold may be determined based on the row. If the TBS threshold is included, the allowed largest TBS is the TBS threshold. If the TBS set does not include the TBS threshold, a TBS that is in the TBS set and that is closest to the TBS threshold and greater than or less than the TBS threshold is determined as the allowed largest TBS.

The TBS threshold may be a preset agreed value, or may be notified by the network device to the terminal device by using indication information. The indication information is used to indicate the TBS threshold.

103. Determine a target TBS in candidate TBSs based on the allowed TBS.

When the target TBS is determined in the candidate TBSs based on the allowed TBS, the determined target TBS may be less than or equal to the allowed TBS. The candidate TBSs may exist in a form of a list. The terminal device may determine the target TBS in the candidate TBSs through table lookup.

The candidate TBSs are all TBSs available when the message 3 may be sent.

For example, if the allowed largest TBS is 1000 bits, the target TBS finally selected from the candidate TBSs is up to 1000 bits.

In one embodiment, before operation 103, the terminal device may further perform determining based on a preset condition, and determine, based on a determining result, whether to perform operation 103.

Specifically, the determining, depending on whether the terminal device meets the preset condition, whether to perform operation 103 includes the following content:

when the terminal device meets the preset condition, the terminal device performs operation 103; or when the terminal device does not meet the preset condition, the terminal device sends the message 3 to the network device based on the allowed TBS and a resource location that are indicated by the first indication information in the message 2.

The preset condition may be any one of the following preset conditions 1 to 3, or the preset condition is any one of preset conditions 4 and 5, or the preset condition is any one of preset conditions 6 to 8, or the preset condition may be a combination of any one of preset conditions 1 to 3 and any one of preset conditions 6 to 8, or the preset condition may be a combination of any one of preset conditions 4 and 5 and any one of preset conditions 6 to 8.

Preset condition 1: A coverage level corresponding to the message 1 sent by the terminal device to the network device is lower than a coverage level threshold.

Preset condition 2: A coverage level corresponding to the message 1 sent by the terminal device to the network device is higher than a coverage level threshold.

Preset condition 3: A coverage level corresponding to the message 1 sent by the terminal device to the network device is equal to a coverage level threshold.

Preset condition 4: A coverage level corresponding to the message 1 sent by the terminal device to the network device belongs to a coverage level set indicated by a base station.

Preset condition 5: A coverage level corresponding to the message 1 sent by the terminal device to the network device does not belong to a coverage level set indicated by a base station.

Preset condition 6: A TBS allowed for the terminal device is greater than a TBS threshold.

Preset condition 7: A TBS allowed for the terminal device is less than a TBS threshold.

Preset condition 8: A TBS allowed for the terminal device is equal to a TBS threshold.

The coverage level reflects a distance between the terminal device and the network device, cell coverage quality, or signal link quality. A lower current coverage level of the terminal device indicates a shorter distance between the terminal device and the network device, better cell coverage quality, or better signal link quality.

The coverage level threshold may be an agreed value, or may be notified by the network device to the terminal device by using indication information (for example, notified to the terminal device by adding a parameter to a message). The indication information is used to indicate the coverage level threshold. A specific value of the coverage level threshold may be 2.

The coverage level set may be an agreed set, or is notified by the network device to the terminal device by using indication information (for example, notified to the terminal device by adding a parameter to a message). The indication information is used to indicate the coverage level set.

Similarly, the TBS threshold may be an agreed value, or may be notified by the network device to the terminal device by using indication information. The indication information is used to indicate the TBS threshold.

A current coverage level of the terminal device may be determined by the terminal device based on a measurement result for a measurement quantity and a measurement quantity threshold. The measurement quantity threshold is determined by using a parameter configured by the network device.

The measurement quantity may be reference signal received power (RSRP), or the measurement quantity is narrowband reference signal received power (NRSRP).

In one embodiment, the terminal device may determine, based on a measurement result for a current measurement quantity and a measurement quantity threshold configured by the network device, the coverage level corresponding to the message 1 sent by the terminal device to the network device.

For example, the base station configures NRSRP thresholds, and the NRSRP thresholds include an NRSRP threshold 1 and an NRSRP threshold 2.

When an NRSRP measurement quantity of the terminal device is less than the NRSRP threshold 1, the coverage level corresponding to the message 1 sent by the terminal device to the network device is a coverage level 0; or when an NRSRP measurement quantity of the terminal device is greater than or equal to the NRSRP threshold 1 and less than the NRSRP threshold 2, the coverage level corresponding to the message 1 sent by the terminal device to the network device is a coverage level 1; or when an NRSRP measurement quantity of the terminal device is greater than the NRSRP threshold 2, the coverage level corresponding to the message 1 sent by the terminal device to the network device is a coverage level 2.

It should be understood that when determining the coverage level corresponding to the message 1 sent by the terminal device to the network device, the network device configures, for each coverage level, a corresponding resource for the message 1.

In one embodiment, the candidate TBSs may be selected from a column in which the allowed TBS is located. For example, in Table 1, if the allowed TBS is 504 bits and the quantity of resource units is 5, the candidate TBSs are determined in TBSs in a corresponding column in which $I_{RU}$ is 4. The candidate TBSs may be less than or equal to the allowed TBS.

104. Send the message 3 to the network device.

After receiving the message 2, the terminal device checks whether the message 2 carries the preamble sequence previously sent by the terminal device. If the message 2 does not include the preamble sequence previously sent by the terminal device, it is considered that random access fails, and the terminal device needs to perform operation 101 again to re-send a message 1; or if the message 2 includes the preamble sequence previously sent by the terminal device, the terminal device sends the message 3 based on a time-frequency resource indicated by an uplink grant (UL grant) in a random access response corresponding to the preamble sequence. When sending the message, the terminal device includes, in the message 3, a unique identifier (C-RNTI) of the terminal device or a terminal device identifier from a core network. Therefore, the message 3 carries the unique identifier of the terminal device to identify the current terminal device that requests access.

For example, after the sending the message 3, the method may further include another necessary operation. For example, the terminal device receives a contention resolution message, namely, a message 4, from the network device. For details, refer to the prior art.

In addition, the message 3 in operation 104 includes uplink data transmitted based on the target TBS. In other words, the uplink data may be sent through the message 3 to the network device, so that the uplink data is sent to the network device in a random access process.

In this application, the target TBS can be freely selected from the candidate TBSs based on the allowed TBS, and the selected target TBS is less than or equal to the allowed TBS. Therefore, in this application, the terminal device can autonomously select an appropriate TBS, without exactly using the allowed TBS indicated by the network device. This improves flexibility for determining a TBS by the terminal device, thereby improving efficiency for transmitting uplink data in a random access process.

In one embodiment, in an embodiment, the determining a target TBS in candidate TBSs based on the allowed TBS specifically includes: determining at least one TBS in the candidate TBSs based on the allowed TBS; and determining, in the at least one TBS based on a size of the uplink data, the target TBS that can be used to transmit the uplink data.

Each of the at least one TBS is less than or equal to the allowed TBS.

It should be understood that the at least one TBS may form a first TBS set, and the determining, in the at least one TBS, the target TBS that can be used to transmit the uplink data is actually determining, in the first TBS set, the target TBS that can be used to transmit the uplink data. In this specification, a meaning represented by the first TBS set is consistent with a meaning of the at least one TBS. Content related to the first TBS set is directly described below.

The following separately describes in detail the determining a first TBS set from the candidate TBSs based on the allowed TBS, and the determining, in the first TBS set based on a size of the uplink data, the target TBS that can be used to transmit the uplink data.

(1) Determine the first TBS set in the candidate TBSs based on the allowed TBS.

Specifically, the first TBS set may be determined in any one of a manner 1 to a manner 4.

Manner 1: Determine, as TBSs in the first TBS set, a preset quantity of TBSs in TBSs that are in the candidate TBSs and that are less than or equal to the allowed TBS.

The manner 1 is equivalent to first determining a second TBS set in the candidate TBSs, where any TBS in the second TBS set is less than or equal to the allowed TBS, and then selecting the preset quantity of TBSs from the second TBS set as TBSs in the first TBS set.

In the manner 1, when the preset quantity of TBSs are selected from the second TBS set, the TBSs may be selected in descending order of values, and a TBS with a larger value is preferentially selected as a TBS in the first TBS set until a quantity of selected TBSs reaches the preset quantity.

For example, the candidate TBSs are {TBS 1, TBS 2, TBS 3, TBS 4, TBS 5, TBS 6}, values of the TBS 1 to the TBS 6 are {144, 328, 504, 680, 872, 1000} sequentially, the allowed largest TBS is 900, and only the TBS 6 in the candidate TBSs is greater than the allowed largest TBS. Therefore, the TBS 1 to the TBS 5 in the candidate TBSs may be determined as elements in the second TBS set, to obtain the second TBS set: {TBS 1, TBS 2, TBS 3, TBS 4, TBS 5}. Then four TBSs are selected from the second TBS set in descending order of values as TBSs in the first TBS set, to obtain the first TBS set: {TBS 2, TBS 3, TBS 4, TBS 5}.

In one embodiment, in the manner 1, when the preset quantity of TBSs are selected from the second TBS set, the TBSs may be alternatively selected in ascending order of TBS values, and a TBS with a smaller value is preferentially selected as a TBS in the first TBS set until a quantity of selected TBSs reaches the preset quantity.

In one embodiment, in the manner 1, when the preset quantity of TBSs are selected from the second TBS set, the preset quantity of TBSs are directly randomly selected from the second TBS set without considering a TBS value.

In one embodiment, when the allowed largest TBS is a TBS n, the terminal device may specifically obtain, through mapping for the TBS n according to a preset rule, n (n is an integer greater than or equal to 1) TBSs that may be used for transmission on an available resource: a TBS 1, a TBS 2, . . ., and the TBS n. Then the terminal device selects a TBS from the n TBSs as the target TBS based on the size of the uplink data.

For example, as shown in Table 1, when the $I_{TBS}$ indicated by the uplink grant information is 10 and the allowed largest TBS is 1000 bits, it can be learned based on Table 1 that the candidate TBSs are {144, 328, 504, 680, 872, 1000}. Each of the candidate TBSs is less than or equal to 1000 bits. In this case, 1000, 872, 680, and 504 may be selected from the candidate TBSs in descending order as the first TBS set, to obtain the first TBS set: {504, 680, 872, 1000}.

As shown in Table 1, when the $I_{TBS}$ indicated by the uplink grant information is another value, the first TBS set may be alternatively determined in a manner similar to that in the foregoing paragraph. For example, the allowed largest TBS is 1000 bits. When the $I_{TBS}$ indicated by the uplink grant information is 4, the obtained first TBS set is {408, 552, 680}; or when the $I_{TBS}$ indicated by the uplink grant information is 8, the obtained first TBS set is {392, 536, 680, 808}.

TABLE 1

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | |
| 8 | 120 | 256 | 392 | 536 | 680 | 808 | | |
| 9 | 136 | 296 | 456 | 616 | 776 | 936 | | |
| 10 | 144 | 328 | 504 | 680 | 872 | 1000 | | |
| 11 | 176 | 376 | 584 | 776 | 1000 | | | |
| 12 | 208 | 440 | 680 | 1000 | | | | |

Manner 2: Determine, as TBSs in the first TBS set, TBSs greater than a preset value in TBSs that are in the candidate TBSs and that are less than or equal to the allowed TBS.

Specifically, in the manner 2, a second TBS set may be first determined in the candidate TBSs, where any TBS in the second TBS set is less than or equal to the allowed TBS, and then the TBSs greater than the preset value are selected from the second TBS set as TBSs in the first TBS set.

For example, the candidate TBSs are {TBS 1, TBS 2, TBS 3, TBS 4, TBS 5, TBS 6}, values of the TBS 1 to the TBS 6 are {144, 328, 504, 680, 872, 1000} sequentially, a value of the allowed largest TBS is 900, and only the TBS 6 in the candidate TBSs is greater than the allowed largest TBS. Therefore, the TBS 1 to the TBS 5 in the candidate TBSs may be determined as elements in the second TBS set, to obtain the second TBS set: {TBS 1, TBS 2, TBS 3, TBS 4, TBS 5}. Then TBSs whose values are greater than 500 (500 herein is merely an example, and another value may be set based on a situation during actual processing) are selected from the second TBS set as TBSs in the first TBS set. Because values of only the TBS 3, the TBS 4, and the TBS 5 in the second TBS set are greater than 500, the obtained first TBS set is {TBS 3, TBS 4, TBS 5}.

Manner 3: First determine TBSs greater than a preset value in TBSs that are in the candidate TBSs and that are less than or equal to the allowed TBS, and then select a preset quantity of TBSs from the TBSs greater than the preset value as TBSs in the first TBS set.

Specifically, in the manner 3, the terminal device first determines a second TBS set in the candidate TBSs, where any TBS in the second TBS set is less than or equal to the allowed TBS; then selects, from the second TBS set, TBSs greater than the preset value as TBSs in a third TBS set; and finally selects the preset quantity of TBSs from the third TBS set as TBSs in the first TBS set.

For example, the candidate TBSs are {TBS 1, TBS 2, TBS 3, TBS 4, TBS 5, TBS 6}, values of the TBS 1 to the TBS 6 are {144, 328, 504, 680, 872, 1000} sequentially, the allowed largest TBS is 900 bits, and only the TBS 6 in the candidate TBSs is greater than the allowed largest TBS. Therefore, the TBS 1 to the TBS 5 in the candidate TBSs may be determined as elements in the second TBS set, to obtain the second TBS set: {TBS 1, TBS 2, TBS 3, TBS 4, TBS 5}. Then TBSs (the TBS 4, the TBS 5, and the TBS 6) greater than 550 are selected from the second TBS set as the third TBS set, to obtain the third TBS set: {TBS 4, TBS 5, TBS 6}. Finally, two TBSs (the TBS 5 and the TBS 6) are selected from the third TBS set in descending order as TBSs in the first TBS set, to obtain the first TBS set: {TBS 5, TBS 6}.

Manner 4: First determine a preset quantity of TBSs in TBSs that are in the candidate TBSs and that are less than or equal to the allowed TBS, and then select TBSs greater than a preset value from the preset quantity of TBSs as TBSs in the first TBS set.

Specifically, in the manner 4, the terminal device first determines a second TBS set in the candidate TBSs, where any TBS in the second TBS set is less than or equal to the allowed TBS; then selects, from the second TBS set, the preset quantity of TBSs as TBSs in a third TBS set; and finally selects the TBSs greater than the preset value from the third TBS set as TBSs in the first TBS set.

For example, the candidate TBSs are {TBS 1, TBS 2, TBS 3, TBS 4, TBS 5, TBS 6}, values of the TBS 1 to the TBS 6 are {144, 328, 504, 680, 872, 1000} sequentially, the allowed largest TBS is 900 bits, and only the TBS 6 in the candidate TBSs is greater than the allowed largest TBS. Therefore, the TBS 1 to the TBS 5 in the candidate TBSs may be determined as elements in the second TBS set, to obtain the second TBS set: {TBS 1, TBS 2, TBS 3, TBS 4, TBS 5}. Then four TBSs (the TBS 2, the TBS 3, the TBS 4, and the TBS 5) are selected from the second TBS set in descending order of values as TBSs in the third TBS set, to obtain the third TBS set: {TBS 2, TBS 3, TBS 4, TBS 5}. Finally, TBSs {TBS 4, TBS 5} whose values are greater than 600 are selected from the TBSs in the third TBS set as TBSs in the first TBS set, to obtain the first TBS set: {TBS 4, TBS 5}.

It should be understood that the manner 3 and the manner 4 each are equivalent to a combination of the manner 1 and the manner 2. In the manner 1 and the manner 2, after the second TBS set is determined, the preset quantity of TBSs or the TBSs greater than the preset value are selected from the second TBS set as TBSs in the first TBS set. However, in the manner 3 and the manner 4, after the second TBS set is determined, the preset value and a value greater than the preset value are comprehensively considered. Compared with the manner 1 and the manner 2, in the manner 3 and the manner 4, a TBS better matching the finally to-be-sent uplink data can be selected from the candidate TBSs, and a process of determining the target TBS in the first TBS set based on the size of the uplink data is simplified.

Manner 7: Determine, as TBSs in the first TBS set, a preset quantity of TBSs in TBSs that are in the candidate TBSs and that are less than or equal to the allowed TBS.

Specifically, in the manner 7, a second TBS set may be first determined in the candidate TBSs. The second TBS set includes at least the allowed TBS. Any TBS in the second TBS set is less than or equal to the allowed TBS. Then the preset quantity of TBSs are selected from the second TBS set at equal intervals.

The selecting the preset quantity of TBSs from the second TBS set at equal intervals may be: starting from the allowed TBS, selecting TBSs in descending order based on equal TBS intervals, that is, differences between TBSs that are sequentially selected are equal, until the preset quantity of TBSs are selected.

The selecting the preset quantity of TBSs from the second TBS set at equal intervals may be: in a TBS column corresponding to a resource unit, starting from an index corresponding to the allowed TBS, selecting TBSs in descending order based on TBS indexes at equal intervals, that is, differences between indexes corresponding to TBSs that are sequentially selected are equal, until the preset quantity of TBSs are selected as TBSs in the first TBS set. For example, the TBS column corresponding to the resource unit is a column in which $I_{RU}$ is 4, the allowed TBS is 872, and a corresponding index $I_{TBS}$ is 10. In this case, four TBS indexes are sequentially selected in descending order at an interval of 2: 10, 8, 6, and 4. That is, the TBSs in the first TBS set are 872, 680, 504, and 328.

The selecting the preset quantity of TBSs from the second TBS set at equal intervals may be: starting from the allowed TBS, selecting TBSs in descending order based on equal intervals of TBS ratios, that is, ratios between TBSs that are sequentially selected are equal, until the preset quantity of TBSs are selected. For example, the preset quantity is 4, and the selected TBSs in the first TBS set are the allowed TBS, a TBS 1, a TBS 2, and a TBS 3. In this case, ratios between adjacent TBSs are allowed TBS/TBS 1, TBS 1/TBS 2, and TBS 2/TBS 3, and the ratios are approximately equal. That the ratios are approximately equal may be understood as that differences between the ratios are less than a threshold, for example, 0.2.

Manner 8: Determine, as TBSs in the first TBS set, a preset quantity of TBSs greater than a preset value in TBSs that are in the candidate TBSs and that are less than or equal to the allowed largest TBS.

Specifically, in the manner 8, a second TBS set may be first determined in the candidate TBSs. The second TBS set includes at least the largest TBS ($TBS_{max}$) and a minimum TBS ($TBS_{min}$) that are allowed. $TBS_{min}$ is equal to the preset value, or is a TBS that is closest to and greater than the preset value, or is directly specified in a protocol. Then the preset quantity of TBSs are selected from the second TBS set at equal intervals as TBSs in the first TBS set.

The selecting the preset quantity of TBSs from the second TBS set at equal intervals may be: first selecting $TBS_{max}$ and $TBS_{min}$; and then starting from $TBS_{max}$, selecting TBSs in descending order based on equal TBS intervals, that is, differences between TBSs that are sequentially selected are equal, until the preset quantity of TBSs are selected; or starting from $TBS_{min}$, selecting TBSs in ascending order based on equal TBS intervals, that is, differences between TBSs that are sequentially selected are equal, until the preset quantity of TBSs are selected.

The selecting the preset quantity of TBSs from the second TBS set at equal intervals may be: first selecting $TBS_{max}$ and $TBS_{min}$; and then starting from $TBS_{max}$, selecting TBSs in descending order based on equal TBS intervals, that is, differences between TBSs that are sequentially selected are equal, until the preset quantity of TBSs are selected; or starting from $TBS_{min}$, selecting TBSs in ascending order based on equal TBS intervals, that is, differences between TBSs that are sequentially selected are equal, until the preset quantity of TBSs are selected.

The selecting the preset quantity of TBSs from the second TBS set at equal intervals may be: first selecting $TBS_{max}$ and $TBS_{min}$, and selecting TBSs based on equal intervals of TBS ratios, that is, ratios between TBSs that are sequentially selected are approximately equal. For example, the preset quantity is 4, and the selected TBSs in the first TBS set are $TBS_{max}$, a TBS 1, a TBS 2, and $TBS_{min}$. In this case, ratios between adjacent TBSs are $TBS_{max}$/TBS 1, TBS 1/TBS 2, and TBS 2/$TBS_{min}$, and the ratios are approximately equal.

(2) Determine, in the first TBS set (the at least one TBS) based on the size of the uplink data, the target TBS that can be used to transmit the uplink data.

Specifically, the terminal device may determine, in the first TBS set based on the size of the uplink data, the target TBS matching the uplink data. The target TBS matching the uplink data may be a TBS, in the first TBS set, that is greater than or equal to a size of a TB corresponding to the uplink data and whose difference from the size of the TB corresponding to the uplink data falls within a specific range.

In one embodiment, the target TBS that can be used to transmit the uplink data may be specifically determined in the first TBS set in the following two manners (a manner 5 and a manner 6).

Manner 5: First determine TBSs that are in the first TBS set and that are greater than or equal to the size of the TB corresponding to the uplink data, and then select, as the target TBS, any TBS from the TBSs that are in the first TBS set and that are greater than or equal to the size of the TB corresponding to the uplink data.

For example, the first TBS set is {TBS 2, TBS 3, TBS 4, TBS 5}, values of the TBS 2 to the TBS 5 are {328, 504, 680, 872} respectively, and the size of the TB corresponding to the uplink data is 500 bits. In this case, the TBSs that are greater than or equal to the size of the TB corresponding to the uplink data and that are determined in the first TBS set may be {TBS 3, TBS 4, TBS 5}. Then any TBS (for example, the TBS 4) is selected from {TBS 3, TBS 4, TBS 5} as the target TBS.

Manner 6: First determine TBSs that are in the first TBS set and that are greater than or equal to the size of the TB corresponding to the uplink data, and then select, as the target TBS, a TBS with a smallest value from the TBSs that are in the first TBS set and that are greater than or equal to the size of the TB corresponding to the uplink data.

For example, the first TBS set is {TBS 2, TBS 3, TBS 4, TBS 5}, values of the TBS 2 to the TBS 5 are {328, 504, 680, 872} respectively, and the size of the TB corresponding to the uplink data is 500 bits. In this case, the TBSs that are greater than or equal to the size of the TB corresponding to the uplink data and that are determined in the first TBS set may be {TBS 3, TBS 4, TBS 5}. Then a TBS with a smallest value (the TBS 3) is selected from {TBS 3, TBS 4, TBS 5} as the target TBS.

It should be understood that, when the target TBS is being determined, a TBS with a largest value may be alternatively selected, as the target TBS, from the TBSs that are in the first TBS set and that are greater than or equal to the size of the TB corresponding to the uplink data.

In one embodiment, when the target TBS is being determined, a TBS whose difference from the size of the TB corresponding to the uplink data falls within a preset range may be alternatively selected, as the target TBS, from the TBSs that are in the first TBS set and that are greater than or equal to the size of the TB corresponding to the uplink data.

For example, the first TBS set is {TBS 1, TBS 2, TBS 3}. The TBS 1 is 504 bits, the TBS 2 is 680 bits, the TBS 3 is 872 bits, and the size of the TB corresponding to the uplink data is 650 bits. In the TBS 1, the TBS 2, and the TBS 3, both the TBS 2 and the TBS 3 are greater than the size of the TB corresponding to the uplink data. A difference between the TBS 2 and the size of the TB corresponding to the uplink data is 30 bits. A difference between the TBS 3 and the size of the TB corresponding to the uplink data is 222 bits. Assuming that a preset range of a difference between the size of the TB corresponding to the uplink data and a TBS is less than or equal to 250 bits, the difference between the size of the TB corresponding to the uplink data and each of the TBS 2 and the TBS 3 falls within the preset range of the difference. In this case, any TBS may be selected from the TBS 2 and the TBS 3 as the target TBS.

In one embodiment, in an embodiment, the message 1 is carried on a first resource, and the message 1 is carried on the first resource to indicate to send the uplink data through the message 3 to the network device. The first resource may be preset to implement the indication function.

In this application, whether to transmit the uplink data in a random access process can be flexibly indicated depending on whether the message 1 is carried on a specific resource, so that the network device receives the uplink data conveniently.

Specifically, when the message 1 is carried on the specific resource (the first resource is the specific resource), the network device receives the uplink data in the random access process; or when the message 1 is carried on a resource other than the specific resource, the network device can receive the uplink data only after random access is completed (which may be specifically after an RRC link is established).

It should be understood that whether the message 1 is carried on a specific resource may alternatively not be limited in this application. To be specific, regardless of a resource on which the message 1 is sent, the uplink data may be transmitted to the network device in the random access process.

It should be understood that after the message 3 is sent to the network device, the network device decodes the message 3 to obtain the uplink data in the message 3. If the network device fails to decode the message 3, the network device requests re-sending of the message 3. A specific process may be shown in FIG. 5.

Figure 5:
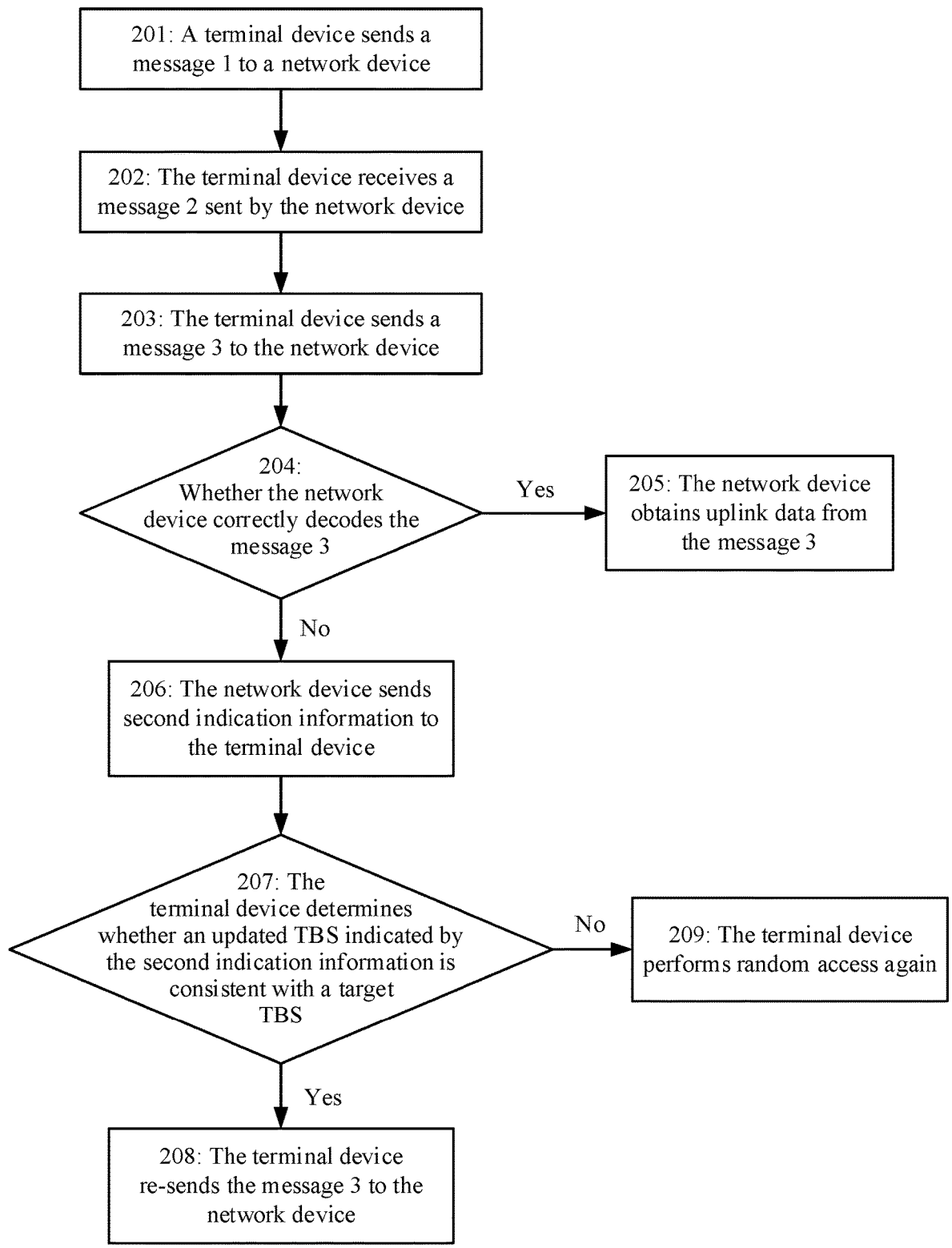
FIG. 5 is a flowchart of a method for transmitting data in a random access process according to an embodiment of this application.

FIG. 5 is a flowchart of a method for transmitting data in a random access process according to an embodiment of this application. The method shown in FIG. 5 may be performed by a terminal device. The method shown in FIG. 5 specifically includes operation 201 to operation 209.

The following separately describes operation 201 to operation 209 in detail.

201. The terminal device sends a message 1 to a network device.

The message 1 may be specifically a preamble sequence for initiating a random access process.

The message 1 may be sent on a specific resource, and the message 1 is sent on the specific resource to indicate the terminal device to send uplink data to the network device in the random access process.

202. The terminal device receives a message 2 sent by the network device.

The message 2 includes uplink grant (UL grant) information. The uplink grant information further includes first indication information. The first indication information is used to indicate a TBS allowed for a message 3.

The terminal device may determine a target TBS in candidate TBSs based on the TBS that is allowed for the message 3 and that is indicated by the first indication information. For a specific manner of determining the target TBS in the candidate TBSs, refer to the foregoing descriptions.

The candidate TBSs are all TBSs available when the message 3 may be sent.

Operation 201 and operation 202 correspond to the foregoing operation 101 and operation 102 respectively. The foregoing limitation and interpretation on operation 101 and operation 102 are also applicable to operation 201 and operation 202.

203. The terminal device sends the message 3 to the network device.

The message 3 includes the uplink data transmitted based on the target TBS.

204. Determine whether the network device correctly decodes the message 3.

It should be understood that, when the network device correctly decodes the message 3, the network device may obtain the uplink data from the message 3 and perform operation 205; or when the network device does not correctly decode the message 3, the network device may indicate the terminal device to re-send the message 3 to transmit the uplink data, that is, perform operation 206.

205. The network device obtains the uplink data from the message 3.

206. The network device sends second indication information to the terminal device. The second indication information is used to indicate to re-send the message 3 and indicate an updated TBS to be used for re-sending the message 3.

207. The terminal device determines whether the updated TBS indicated by the second indication information is consistent with the target TBS.

When the updated TBS is consistent with the target TBS, it indicates that the network device correctly parses out the target TBS. The terminal device may then continue to transmit the uplink data through the message 3 based on the target TBS, and the network device may then decode the message 3 again based on the target TBS. Therefore, when the updated TBS is consistent with the target TBS, operation 208 needs to be performed.

However, when the updated TBS is inconsistent with the target TBS, it indicates that the network device does not correctly parse out the target TBS. Even if the terminal device then retransmits the uplink data through the message 3 based on the target TBS, the network device probably cannot correctly decode the message 3. Therefore, when the updated TBS is inconsistent with the target TBS, random access needs to be performed again, that is, operation 209 is performed.

208. The terminal device re-sends the message 3 to the network device.

Specifically, the re-sent message 3 includes the uplink data transmitted based on the target TBS.

209. The terminal device performs random access again.

Specifically, when the updated TBS is inconsistent with the target TBS, the message 1 is re-sent to the network device to perform random access again. The re-sent message 1 is carried on a second resource to indicate to send the uplink data to the network device after the random access is completed again. The second resource is different from the first resource.

In one embodiment, when the message 1 sent in operation 201 is carried on the first resource, the message 1 re-sent when the random access is performed again in operation 209 may be carried on the first resource or the second resource. The first resource is different from the second resource. When the re-sent message 1 is carried on the first resource, it indicates that the uplink data is still to be sent in a random access process; or when the re-sent message 1 is carried on the second resource, it indicates that a random access process is first completed and then the uplink data is sent to the network device in a subsequent process.

In one embodiment, a manner of sending the message 3 is used to indicate the target TBS.

In this application, the target TBS is indicated by the manner of sending the message 3, so that the network device can decode the message 3 based on the target TBS, thereby simplifying a decoding procedure.

In one embodiment, a DMRS sequence used to send the message 3 may be used to indicate the target TBS.

In this application, the network device may determine the target TBS by determining the DMRS sequence used to send the message 3, so as to perform accurate decoding based on the target TBS subsequently.

Specifically, there is a one-to-one or many-to-one correspondence between a DMRS sequence and a TBS, and one TBS may correspond to at least one DMRS sequence. When a DMRS sequence is used to send the message 3, a TBS corresponding to the DMRS sequence is the target TBS.

For example, TBSs corresponding to a DMRS sequence 1, a DMRS sequence 2, and a DMRS sequence 3 are a TBS 1, a TBS 2, and a TBS 3 respectively. In this case, when the DMRS sequence 2 is used to send the message 3, the TBS 2 is the target TBS.

It should be understood that the correspondence between a DMRS sequence and a TBS may be preset, and the correspondence between a DMRS sequence and a TBS is known to both the terminal device and the network device.

In one embodiment, a time-domain offset, relative to a resource allocated by the network device, of a time-domain start location of a physical uplink shared channel for sending the message 3 is used to indicate the target TBS.

In one embodiment, the time-domain start location may be specifically a location of a start symbol.

In this application, the network device may determine the target TBS by using the time-domain offset, relative to the resource allocated by the network device, of the time-domain start location of the physical uplink shared channel for sending the message 3, so as to perform accurate decoding based on the target TBS.

Specifically, there is a one-to-one or many-to-one correspondence between a time-domain offset, relative to the resource allocated by the network device, of the time-domain start location of the physical uplink shared channel for sending the message 3 and a TBS, and one TBS may correspond to at least one offset value. When sending of the message 3 corresponds to an offset value, a TBS corresponding to the offset value is the target TBS.

For example, time-domain offset values, relative to the resource allocated by the network device, of the time-domain start location of the physical uplink shared channel for sending the message 3 include an offset 1, an offset 2, an offset 3, and an offset 4, and TBSs corresponding to these offset values are a TBS 1, a TBS 2, a TBS 3, and a TBS 4 respectively. In this case, when a time-domain offset value, relative to the resource allocated by the network device, of the time-domain start location of the physical uplink shared channel for sending the message 3 is the offset 2, the TBS 2 is the target TBS.

It should be understood that the correspondence between an offset value and a TBS may be preset, and the correspondence between an offset value and a TBS is known to both the terminal device and the network device.

Figure 6:
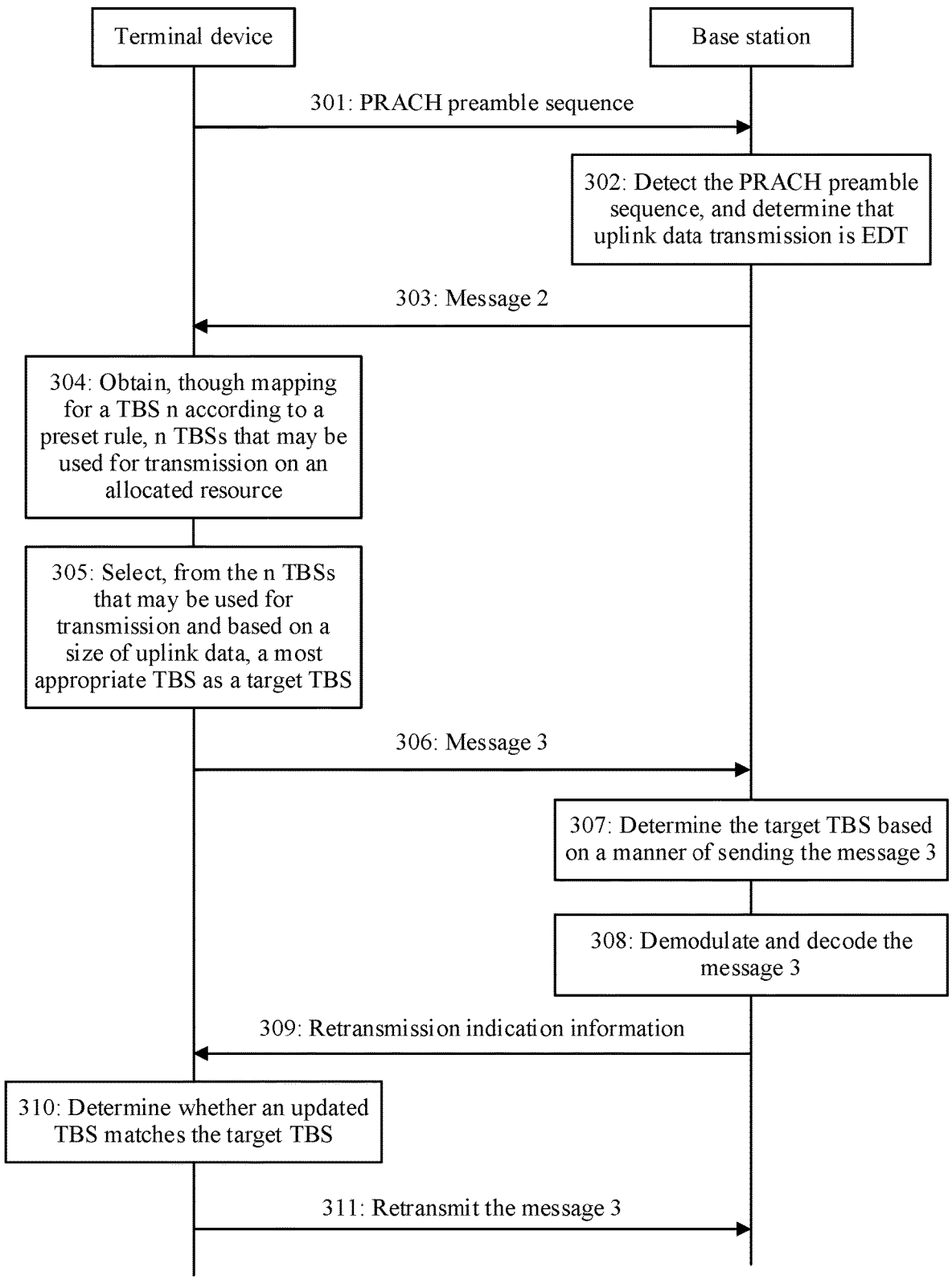
FIG. 6 is a flowchart of a method for transmitting data in a random access process according to an embodiment of this application.
Figure 7:
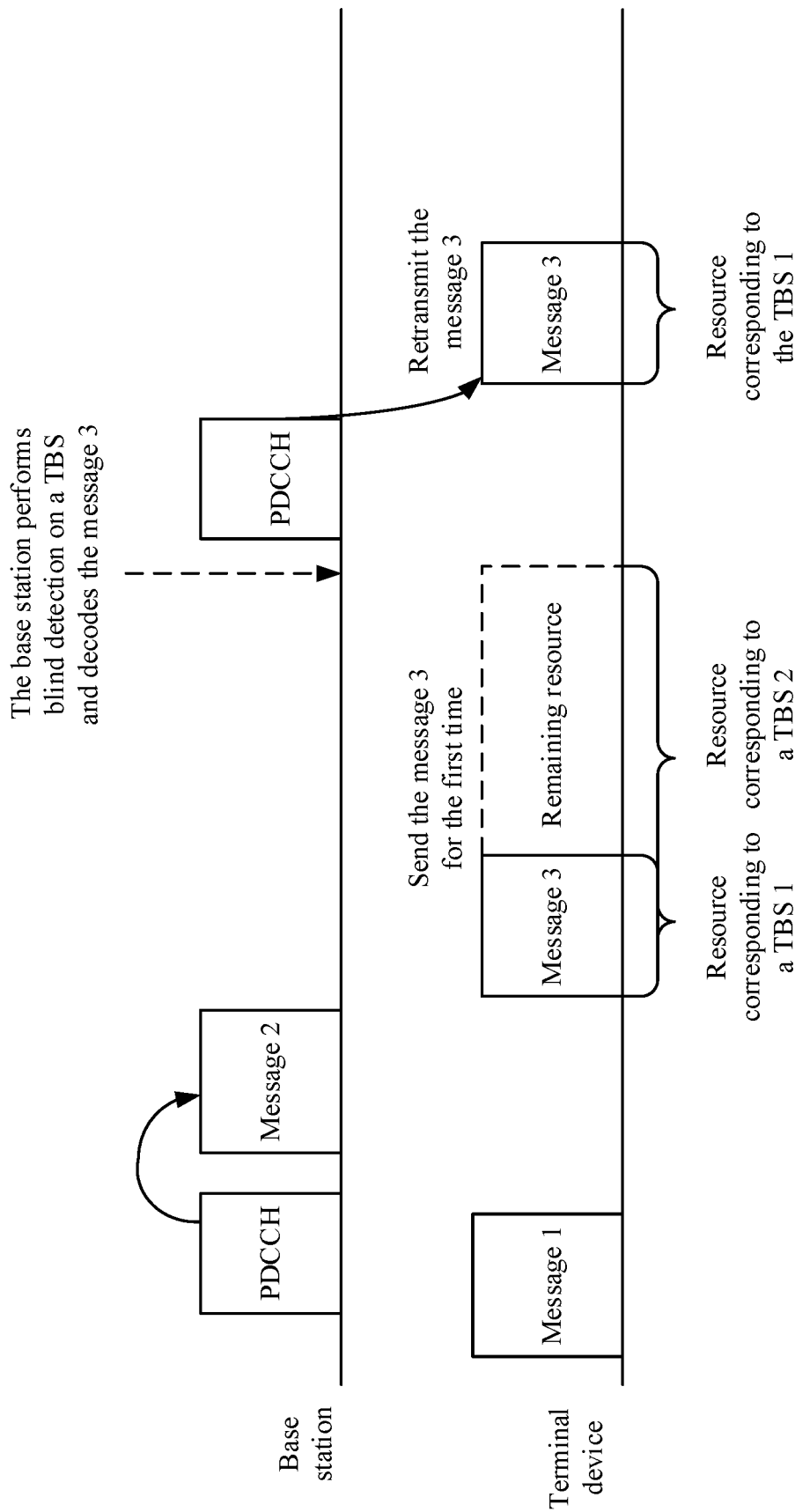
FIG. 7 is a schematic diagram of a method for transmitting data in a random access process according to an embodiment of this application.

By using a communications system including a terminal device and a base station as an example, the following describes in detail a method for transmitting data in a random access process in an embodiment of this application with reference to FIG. 6 and FIG. 7.

301. The terminal device sends a PRACH preamble sequence (a message 1) to the base station on a specific physical random access channel (PRACH) preamble sequence resource.

The specific PRACH preamble sequence resource is specially used for early data transmission (EDT). In this case, the terminal device sends uplink data in a random access process.

302. The base station detects the preamble sequence on the specific PRACH preamble sequence resource, determines that uplink data transmission is EDT, and determines to send a message 2 to the terminal device.

303. The base station sends the message 2 to the terminal device.

The base station cannot determine a size of uplink data to be sent by the terminal device. Therefore, the base station allocates an uplink resource based on a preset TBS (for example, a TBS n), and allocates, by using an uplink grant (UL grant) in a random access response in the message 2, a resource used by the terminal device to send a message 3.

As shown in FIG. 7, the terminal device first sends the message 1 to the base station, and after receiving the message 1, the base station sends the message 2 to the terminal device on a physical downlink control channel (PDCCH).

304. The terminal device obtains, through mapping for the TBS n according to a preset rule, n TBSs that may be used for transmission on the allocated resource: a TBS 1, a TBS 2, . . . , and the TBS n.

For example, as shown in Table 1, when $I_{TBS}$ indicated by the uplink grant in the message 2 is 10 and the TBS n is 1000 bits, the TBSs obtained by the terminal device through mapping for the TBS n according to the preset rule are {144, 328, 504, 680, 872, 1000}.

305. The terminal device selects, from the n TBSs {TBS 1, TBS 2, . . . , TBS n} that may be used for transmission and based on the size of the uplink data that needs to be sent, a most appropriate TBS as a target TBS (which may be denoted as a selected TBS), where the target TBS is used to send the uplink data in the message 3.

Specifically, the terminal device may select a TBS with a smallest padding ratio (padding ratio) to send the message 3.

In addition, the message 3 includes a terminal ID of the terminal device and a non-access stratum protocol data unit (non access stratum protocol data unit, NAS PDU) of the uplink data that needs to be sent.

306. The terminal device sends the message 3 on a physical uplink shared channel based on the target TBS.

For example, as shown in FIG. 7, an allowed largest TBS indicated by the network device is a TBS 2, the terminal device selects a TBS 1 as the target TBS based on the size of the uplink data, and the terminal device sends the message 3 based on the TBS 1. Because a resource corresponding to the TBS 2 is greater than a resource corresponding to the TBS 1, when sending the message 3, the terminal device uses only a part of the resource allocated by the network device. As shown in FIG. 7, a part of the resource allocated by the network device is left unused.

A manner of sending the message 3 by the terminal device is used to indicate the target TBS, and the base station may obtain the target TBS based on the manner of sending the message 3.

In addition, when the terminal device is an NB-IoT terminal device, the terminal device may alternatively send the message 3 on a narrowband physical uplink shared channel based on the target TBS.

307. The base station determines the target TBS based on the manner of sending the message 3.

After determining the target TBS, the base station may demodulate and decode the message 3 based on the target TBS.

In one embodiment, a DMRS sequence used to send the message 3 may be used to indicate the target TBS.

For example, sizes of TBSs corresponding to a DMRS 1, a DMRS 2, a DMRS 3, and a DMRS 4 are 504 bits, 680 bits, 872 bits, and 1000 bits respectively. In this case, when the terminal device selects a TBS of 680 bits as the target TBS, the terminal device selects the DMRS 2 to send the message 3. In this way, when determining that a DMRS sequence corresponding to the message 3 is the DMRS 2, the base station may determine, based on the correspondence between the DMRS sequences and the TBSs, that a size of the target TBS is 680 bits.

In one embodiment, a time-domain offset, relative to the resource allocated by the base station, of a time-domain start location of the physical uplink shared channel for sending the message 3 is used to indicate the target TBS.

For example, sizes of TBSs corresponding to offset values of an offset 1, an offset 2, an offset 3, and an offset 4 are 504 bits, 680 bits, 872 bits, and 1000 bits respectively. In this case, when the terminal device selects a TBS of 680 bits as the target TBS, the terminal device sends the message 3 based on a corresponding offset value. In this way, when determining that an offset value is the offset 2, the base station may determine, based on the correspondence between the offset values and the TBSs, that a size of the target TBS is 680 bits.

308. The base station demodulates and decodes the message 3.

309. The base station does not correctly decode the message 3, and the base station schedules, based on the determined target TBS, the terminal device to re-send the message 3.

It should be understood that when scheduling the terminal device to re-send the message 3, the base station only needs to schedule, based on the target TBS, the terminal device to retransmit the uplink data, and does not need to schedule, based on a largest TBS indicated by the message 2, the terminal device to retransmit the uplink data, thereby saving resources. For example, the largest TBS indicated by the base station by using the message 2 is 1000 bits, and the target TBS identified by the base station is 504 bits. In this case, when failing to decode the message 3, the base station may schedule, based on the TBS of 504 bits, the terminal device to retransmit the message 3.

Specifically, the base station may send retransmission indication information to the terminal device, to indicate the terminal device to re-send the message 3. The indication information may further indicate an updated TBS, so that the terminal device retransmits the message 3 based on the updated TBS.

310. The terminal device determines whether the updated TBS matches the target TBS.

311. If the updated TBS matches the target TBS (the updated TBS and the target TBS may be specifically the same), the terminal device retransmits the message 3; or if the updated TBS does not match the target TBS, the terminal device gives up a current random access process.

It should be understood that, after giving up the current random access process, the terminal device may further continue to initiate a random access process, and send the uplink data to the base station in the random access process or after the random access process ends.

For example, as shown in FIG. 7, the base station performs blind detection on a TBS and decodes the message 3. When the base station does not correctly decode the message 3, the base station sends retransmission indication information to the terminal device by using a PDCCH, to indicate the terminal device to re-send the message 3. After receiving an indication of the retransmission indication information, the terminal device determines whether an updated TBS indicated by the retransmission indication information is consistent with the target TBS (in this case, the target TBS is the TBS 1). If the updated TBS is consistent with the target TBS, the terminal device retransmits the message 3 to the base station based on the TBS 1. When the updated TBS is consistent with the target TBS (the updated TBS is the TBS 1), the resource allocated by the base station to the terminal device is the resource corresponding to the TBS 1, and the resource corresponding to the TBS 1 can be all used to retransmit the message 3, so that fewer resources are wasted in an uplink data transmission process.

The foregoing describes in detail the method for transmitting the data in the random access process in the embodiments of this application with reference to FIG. 1 to FIG. 7. The following describes in detail an apparatus for transmitting data in a random access process in the embodiments of this application with reference to FIG. 8 to FIG. 9. It should be understood that, the method for transmitting the data in the random access process in the embodiments of this application may be performed by the apparatuses in FIG. 8 and FIG. 9. For brevity, repeated descriptions are appropriately omitted below.

Figure 8:
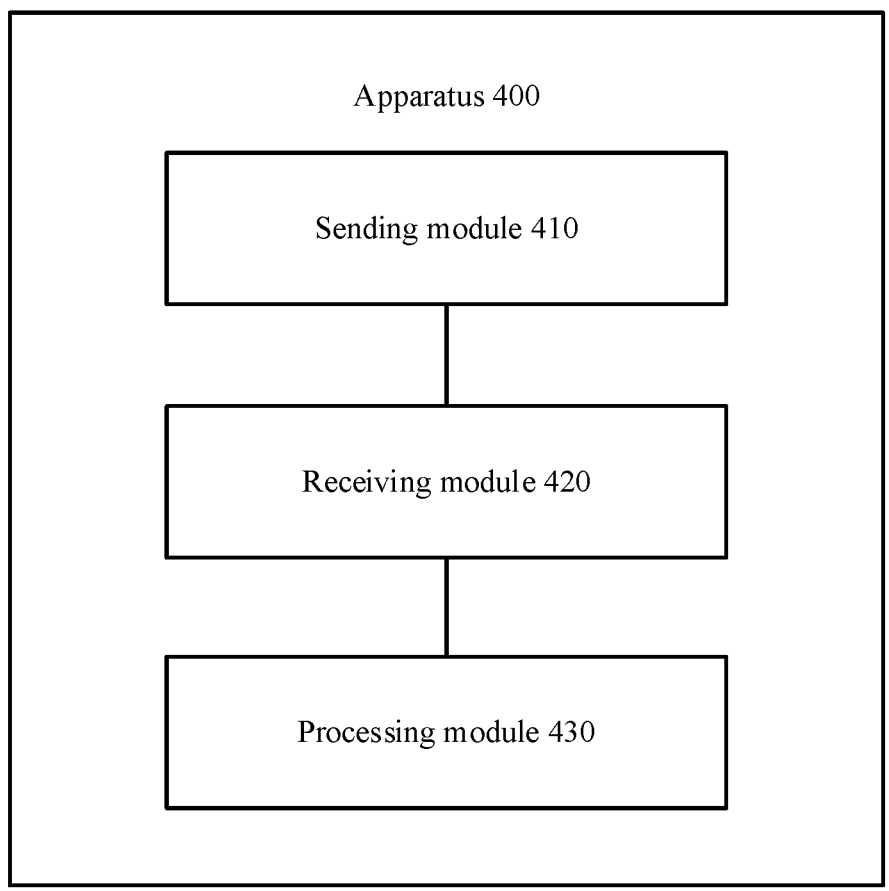
FIG. 8 is a schematic block diagram of an apparatus for transmitting data in a random access process according to an embodiment of this application.

FIG. 8 is a schematic block diagram of an apparatus for transmitting data in a random access process according to an embodiment of this application. The apparatus 400 shown in FIG. 8 includes:

a sending module 410, configured to send a message 1 to a network device;

a receiving module 420, configured to receive a message 2 sent by the network device, where the message 2 includes uplink grant information, the uplink grant information includes first indication information, and the first indication information is used to indicate a transport block size TBS allowed for a message 3; and a processing module 430, configured to determine a target TBS in candidate TBSs based on the allowed TBS, where the target TBS is less than or equal to the allowed TBS; where the sending module 410 is further configured to send the message 3 to the network device, where the message 3 includes uplink data transmitted based on the target TBS.

In this application, the target TBS can be freely selected from the candidate TBSs based on the allowed TBS, and the selected target TBS is less than or equal to the allowed TBS. Therefore, in this application, the terminal device can autonomously select an appropriate TBS, without exactly using the allowed TBS indicated by the network device. This improves flexibility for determining a TBS by the terminal device, thereby improving efficiency for transmitting uplink data in a random access process.

In one embodiment, the receiving module 420 receives second indication information sent by the network device. Correspondingly, the sending module 410 is further configured to re-send the message 3 to the network device or re-send the message 1 to the network device to perform random access again. For details, refer to corresponding descriptions in the foregoing method embodiments.

Figure 9:
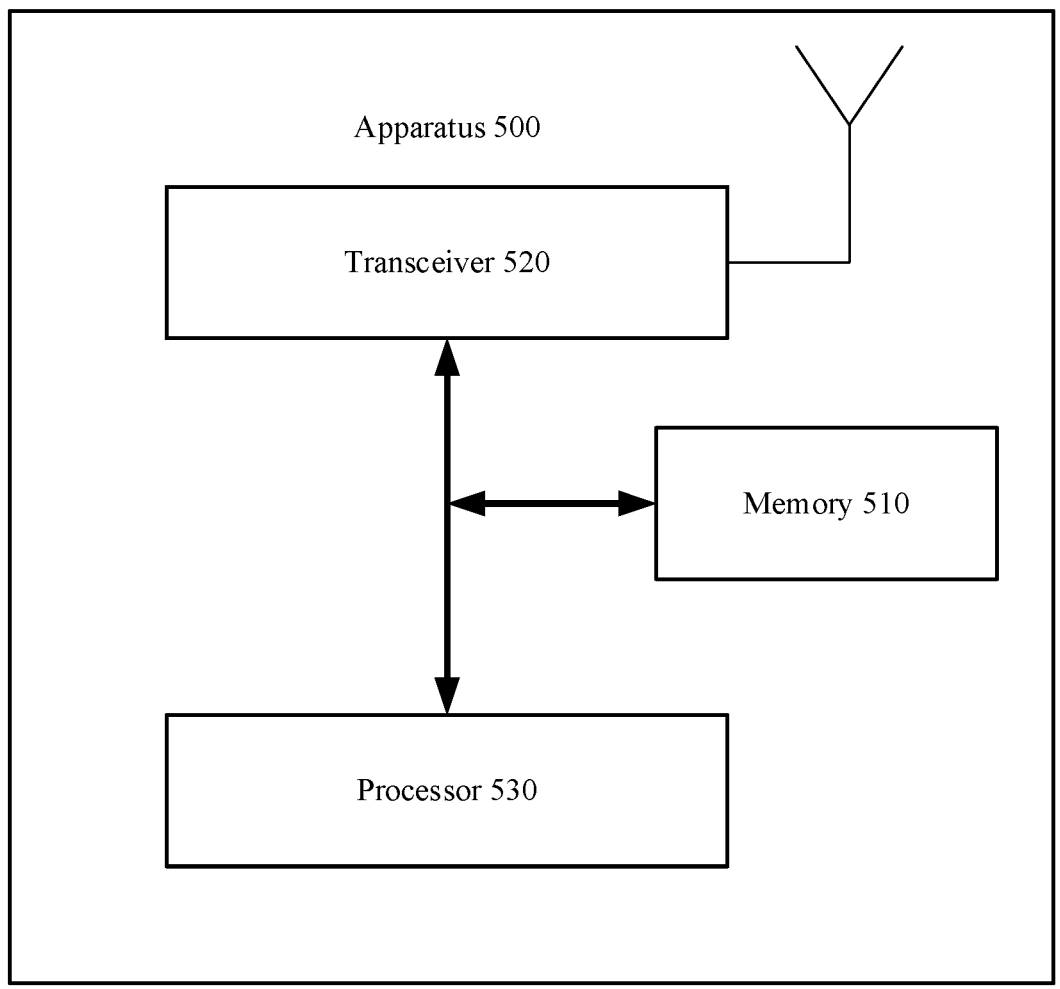
FIG. 9 is a schematic block diagram of an apparatus for transmitting data in a random access process according to an embodiment of this application.

FIG. 9 is a schematic block diagram of an apparatus for transmitting data in a random access process according to an embodiment of this application. The apparatus 500 shown in FIG. 9 includes:

a memory 510, configured to store a program;

a transceiver 520, configured to send a message 1 to a network device, where the transceiver 520 is further configured to receive a message 2 sent by the network device, the message 2 includes uplink grant information, the uplink grant information includes first indication information, and the first indication information is used to indicate a transport block size TBS allowed for a message 3; and a processor 530, configured to execute the program stored in the memory 510, where when the program in the memory 510 is executed, the processor 530 is specifically configured to determine a target TBS in candidate TBSs based on the allowed TBS, and the target TBS is less than or equal to the allowed TBS; where the transceiver 520 is further configured to send the message 3 to the network device, and the message 3 includes uplink data transmitted based on the target TBS.

In this application, the target TBS can be freely selected from the candidate TBSs based on the allowed TBS, and the selected target TBS is less than or equal to the allowed TBS. Therefore, in this application, the terminal device can autonomously select an appropriate TBS, without exactly using the allowed TBS indicated by the network device. This improves flexibility for determining a TBS by the terminal device, thereby improving efficiency for transmitting uplink data in a random access process.

The apparatus 400 and the apparatus 500 may be specifically a terminal device or an apparatus in a terminal device. The apparatus may include a chip, a chip set, or a circuit board in the terminal device, or may include another necessary software module. The apparatus 400 and the apparatus 500 may perform the operations in the method for transmitting the data in the random access process in the embodiments of this application.

The apparatus 500 may include one or more chips. For example, at least one of the memory 510, the transceiver 520, or the processor 530 may include the one or more chips. The processor 530 may execute the program stored in the memory 510, to implement the method in the foregoing method embodiments. When the processor 530 needs to perform signal receiving and sending, the processor 530 controls or invokes the transceiver 520 to implement the receiving and sending. Therefore, the sending operations or the receiving operations in the method embodiments may be considered to be performed by at least one of the transceiver 520 and the processor 530. The processor 530 is used as an initiator of the sending operation or the receiving operation, and the transceiver 520 is used as a specific executor of the sending operation or the receiving operation. For example, the transceiver 520 may be a radio frequency unit, including an upmixer for sending a signal and a downmixer for receiving a signal.

A person of ordinary skill in the art may be aware that, in combination with the examples described in the embodiments disclosed in this specification, units and algorithm operations can be implemented by electronic hardware or a combination of computer software and electronic hardware. For example, the apparatus 400 may be a software apparatus or a hardware apparatus. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

When the method procedures or the functions in the embodiments are implemented in a form of a software functional unit and sold or used as an independent product, the method procedures or the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions, to cause a computer device (which may be a personal computer, a server, a network device, or the like) to perform all or some of the operations in the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A method for transmitting data in a random access process performed by a terminal device, the method comprising:
   sending a message 1 of the random access process to a network device;
   receiving a message 2 of the random access process from the network device, wherein the message 2 comprises uplink grant information, wherein the uplink grant information comprises first indication information, and wherein the first indication information is used to indicate a largest transport block size (TBS) allowed for a message 3 of the random access process;
   in response to determining that a coverage level meets a preset condition, determining one of candidate TBSs as a target TBS based on the largest TBS, wherein the target TBS is less than or equal to the largest TBS;
   in response to determining that the coverage level does not meet the preset condition, determining the largest TBS as the target TBS; and
   sending the message 3 using the target TBS to the network device, wherein the message 3 comprises uplink data.

2. The method according to claim 1, wherein the preset condition comprises:
   the coverage level corresponding to the message 1 belongs to a coverage level set indicated by the network device.

3. The method according to claim 1, wherein the message 1 is carried on a first resource to indicate to send the uplink data through the message 3 to the network device.

4. The method according to claim 3, wherein the method further comprises:
   receiving second indication information from the network device, wherein the second indication information is used to indicate to re-send the message 3 and indicate an updated TBS to be used for re-sending the message 3; and
   when the updated TBS is consistent with the target TBS, re-sending the message 3 based on the target TBS to the network device, wherein the re-sent message 3 comprises the uplink data.

5. The method according to claim 3, wherein the method further comprises:
   receiving second indication information from the network device, wherein the second indication information is used to indicate to re-send the message 3 and indicate an updated TBS to be used for re-sending the message 3; and
   when the updated TBS is inconsistent with the target TBS, re-sending the message 1 to the network device to perform random access again, wherein the message 1 is carried on a second resource to indicate to send the uplink data to the network device after the random access is completed again, and the second resource is different from the first resource.

6. The method according to claim 1, wherein a manner of sending the message 3 is used to indicate the target TBS.

7. The method according to claim 6, wherein the manner of sending the message 3 comprises:
   a DMRS sequence used to send the message 3, or
   a time-domain offset, relative to a resource allocated by the network device, of a time-domain start position of a physical uplink shared channel for sending the message 3.

8. An apparatus for transmitting data in a random access process, comprising:
   a memory storing program instructions; and
   at least one processor coupled to the memory, wherein the program instructions, when executed by the at least one processor, cause the apparatus to send a message 1 of the random access process to a network device;
   receive a message 2 of the random access process from the network device, wherein the message 2 comprises uplink grant information, wherein the uplink grant information comprises first indication information, and wherein the first indication information is used to indicate a largest transport block size (TBS) allowed for a message 3 of the random access process;
   in response to determining that a coverage level meets a preset condition, determine one of candidate TBSs as a target TBS based on the largest TBS, wherein the target TBS is less than or equal to the largest TBS;
   in response to determining that the coverage level does not meet the preset condition, determining the largest TBS as the target TBS;
   send the message 3 to the network device using the target TBS, wherein the message 3 comprises uplink data.

9. The apparatus according to claim 8, wherein the preset condition comprises:
   the coverage level corresponding to the message 1 belongs to a coverage level set indicated by the network device.

10. The apparatus according to claim 8, wherein the message 1 is carried on a first resource to indicate to send the uplink data through the message 3 to the network device.

11. The apparatus according to claim 10, wherein the program instructions, when executed by the at least one processor, further cause the apparatus to receive second indication information from the network device, wherein the second indication information is used to indicate to re-send the message 3 and indicate an updated TBS to be used for re-sending the message 3; and
   when the updated TBS is consistent with the target TBS, re-send the message 3 based on the target TBS to the network device, and the re-sent message 3 comprises the uplink data.

12. The apparatus according to claim 10, wherein the program instructions, when executed by the at least one processor, further cause the apparatus to
   receive second indication information from the network device, wherein the second indication information is used to indicate to re-send the message 3 and indicate an updated TBS to be used for re-sending the message 3; and
   when the updated TBS is inconsistent with the target TBS, re-send the message 1 to the network device to perform random access again, wherein the message 1 is carried on a second resource to indicate to send the uplink data to the network device after the random access is completed again, and the second resource is different from the first resource.

13. The apparatus according to claim 8, wherein a manner of sending the message 3 is used to indicate the target TBS.

14. The apparatus according to claim 13, wherein the manner of sending the message 3 comprises:
   a DMRS sequence used to send the message 3, or
   a time-domain offset, relative to a resource allocated by the network device, of a time-domain start position of a physical uplink shared channel for sending the message 3.

15. A non-transitory computer-readable storage medium having instructions stored therein, which when executed by at least one processor of an apparatus, cause the apparatus to:

send a message 1 of a random access process to a network device;

receive a message 2 of the random access process from the network device, wherein the message 2 comprises uplink grant information, wherein the uplink grant information comprises first indication information, and wherein the first indication information is used to indicate a largest transport block size (TBS) allowed for a message 3 of the random access process;

in response to determining that a coverage level meets a preset condition, determine one of candidate TBSs as a target TBS based on the largest TBS, wherein the target TBS is less than or equal to the largest TBS;

in response to determining that the coverage level does not meet the preset condition, determining the largest TBS as the target TBS; and send the message 3 to the network device using the target TBS, wherein the message 3 comprises uplink data.

16. The non-transitory computer-readable storage medium according to claim 15, wherein the preset condition comprises:

the coverage level corresponding to the message 1 belongs to a coverage level set indicated by the network device.

17. The non-transitory computer-readable storage medium according to claim 15, wherein the message 1 is carried on a first resource to indicate to send the uplink data through the message 3 to the network device.

18. The non-transitory computer-readable storage medium according to claim 17, wherein the program instructions, when executed by the at least one processor, further cause the apparatus to receive second indication information from the network device, wherein the second indication information is used to indicate to re-send the message 3 and indicate an updated TBS to be used for re-sending the message 3; and when the updated TBS is consistent with the target TBS, re-send the message 3 based on the target TBS to the network device, and the re-sent message 3 comprises the uplink data.

19. The non-transitory computer-readable storage medium to claim 17, wherein the program instructions, when executed by the at least one processor, further cause the apparatus to receive second indication information from the network device, wherein the second indication information is used to indicate to re-send the message 3 and indicate an updated TBS to be used for re-sending the message 3; and when the updated TBS is inconsistent with the target TBS, re-send the message 1 to the network device to perform random access again, wherein the message 1 is carried on a second resource to indicate to send the uplink data to the network device after the random access is completed again, and the second resource is different from the first resource.

20. The non-transitory computer-readable storage medium according to claim 15, wherein a manner of sending the message 3 is used to indicate the target TBS.

21. The method according to claim 1, wherein the preset condition comprises:

the coverage level corresponding to the message 1 belonging to a coverage level set indicated by the network device.

22. The apparatus according to claim 8, wherein the preset condition comprises:

the coverage level corresponding to the message 1 belonging to a coverage level set indicated by the network device.

23. The non-transitory computer-readable storage medium according to claim 15, wherein the preset condition comprises:

the coverage level corresponding to the message 1 belonging to a coverage level set indicated by the network device.

* * * * *